(12) United States Patent
Kuwano et al.

(10) Patent No.: US 7,859,707 B2
(45) Date of Patent: Dec. 28, 2010

(54) PRINTER

(75) Inventors: Hideyuki Kuwano, Osaka (JP); Kenji Hisatomi, Osaka (JP)

(73) Assignee: Panasonic Corporation, Osaka (JP)

( * ) Notice: Subject to any disclaimer, the term of this patent is extended or adjusted under 35 U.S.C. 154(b) by 1051 days.

(21) Appl. No.: 11/629,075

(22) PCT Filed: Jun. 6, 2005

(86) PCT No.: PCT/JP2005/010346

§ 371 (c)(1),
(2), (4) Date: Dec. 11, 2006

(87) PCT Pub. No.: WO2005/125173

PCT Pub. Date: Dec. 29, 2005

(65) Prior Publication Data

US 2008/0291497 A1   Nov. 27, 2008

(30) Foreign Application Priority Data

Jun. 15, 2004 (JP) .............................. 2004-176816
Dec. 24, 2004 (JP) .............................. 2004-372934

(51) Int. Cl.
*G06F 3/12* (2006.01)
*G06F 15/00* (2006.01)

(52) U.S. Cl. .................. 358/1.18; 358/1.9; 358/1.12; 358/528; 358/537; 358/538; 358/448; 358/452; 358/453; 715/234; 715/235; 715/243; 715/246; 715/247; 715/252; 715/255

(58) Field of Classification Search ............... 358/1.9, 358/1.12, 1.18, 528, 537, 538, 448, 452, 358/453; 715/234, 235, 243, 246, 247, 252, 715/255
See application file for complete search history.

(56) References Cited

U.S. PATENT DOCUMENTS

| 6,774,951 | B2 | 8/2004 | Narushima |
| 7,184,167 | B1 * | 2/2007 | Ito et al. .................... 358/1.18 |
| 2003/0137691 | A1 | 7/2003 | Tanaka |
| 2004/0021901 | A1 | 2/2004 | Watanabe |

(Continued)

FOREIGN PATENT DOCUMENTS

JP    2001-237783    8/2001

(Continued)

*Primary Examiner*—Chan S Park
(74) *Attorney, Agent, or Firm*—Wenderoth, Lind & Ponack, L.L.P.

(57) ABSTRACT

The present invention provides a printing apparatus which can prevent surrounding borders from becoming uneven and unnecessary borders from appearing, and which can optimally print object data even when the aspect ratio of the object data is maintained. The printing apparatus 200 includes: a print data analysis unit 203 having a layout area information obtainment unit 2032 which obtains layout area information indicating a layout area, and an effective drawing area information obtainment unit 2033 which obtains effective drawing area information indicating a printing area which is dependent on the printing apparatus 200; and a layout unit 204 which lays out, based on the size of the object data which is the object to be printed and the size of a layout area on layout area, and in addition lays out, based on the size of the layout area and an effective drawing area, the layout area onto the effective drawing area.

13 Claims, 37 Drawing Sheets

U.S. PATENT DOCUMENTS

2004/0218209 A1    11/2004  Hamaguchi et al.
2008/0137967 A1*    6/2008  Yamamoto .................. 382/214
2009/0242735 A1*   10/2009  Masuyama et al. ....... 250/208.1

FOREIGN PATENT DOCUMENTS

| JP | 2003-216367 | 7/2003 |
| JP | 2004-072350 | 3/2004 |
| JP | 2004-164561 | 6/2004 |

* cited by examiner

FIG. 4
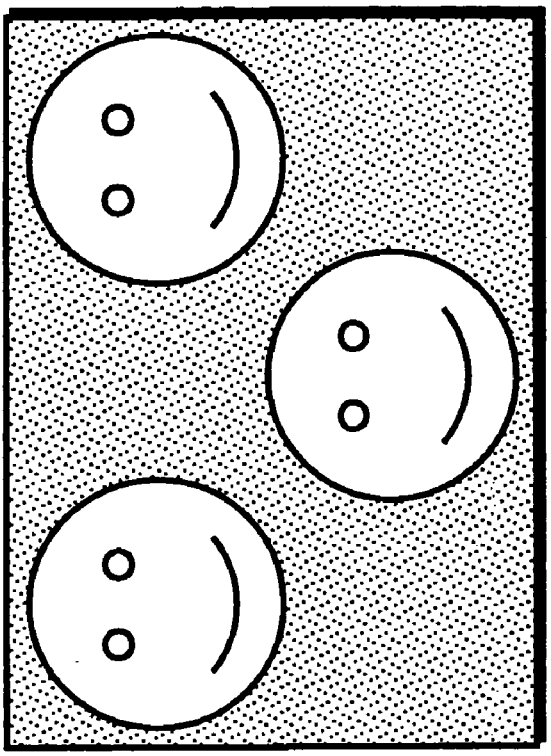
(b) Borderless
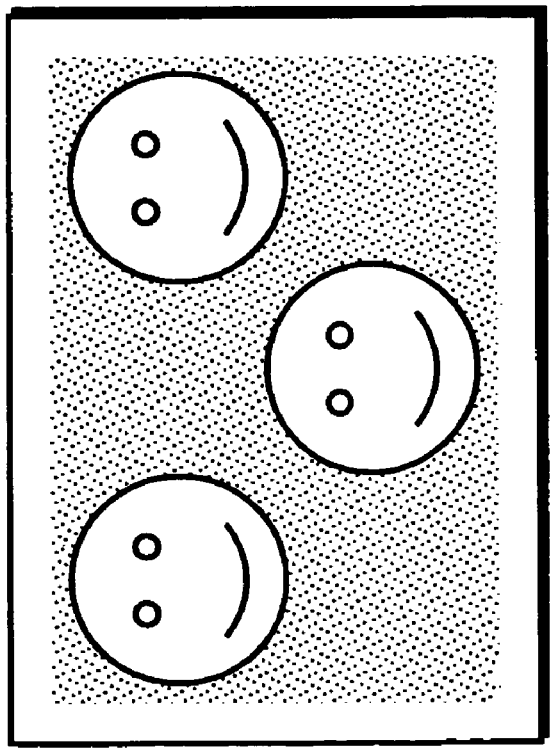
(a) Bordered

FIG. 5
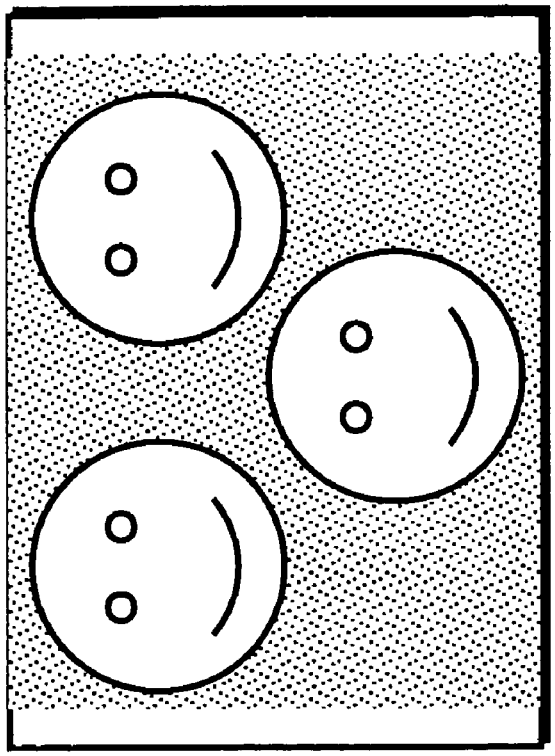
(a) Bordered
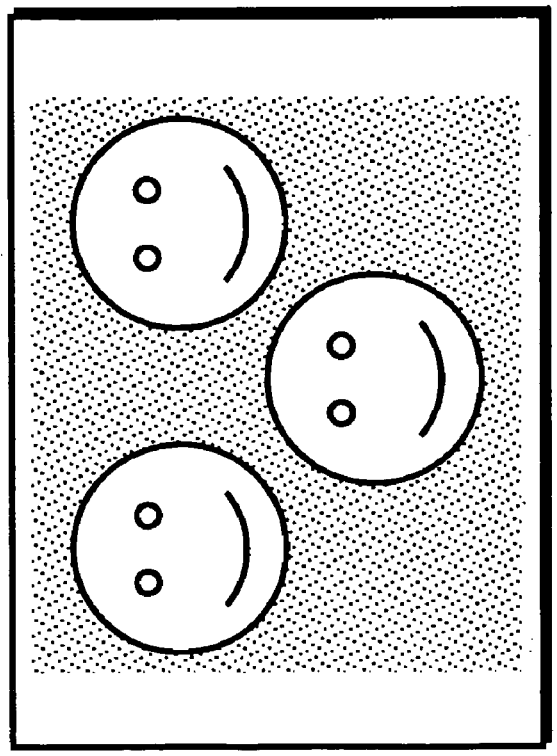
(b) Borderless

FIG. 8

```
<html>
<head>
<title>title</title>
<meta http-equiv="Content-Style-Type" content="text/css"/>
<style type="text/css">
@page yoko { size:127mm 89mm; margin:0; }   ~21
div.yoko {page:yoko;}
body{ padding:4mm;}   ~22
</style>
</head>
<body>
<div class="yoko">
<img src="yoko.jpg" height="100%" />   ~23
</div>
</body>
</html>
```

FIG. 11

```
<html>
  <head>
    <title>title</title>
    <meta http-equiv="Content-Style-Type" content="text/css"/>
    <style type="text/css">
      @page yoko { size:landscape; margin:0; }    ──24
      div.yoko {page:yoko;}
      body{ padding:0;}
    </style>
  </head>
  <body>
    <div class="yoko" style="page-break-before:avoid">
      <img src="yoko.jpg"/>    ──25
    </div>
  </body>
</html>
```

FIG. 12
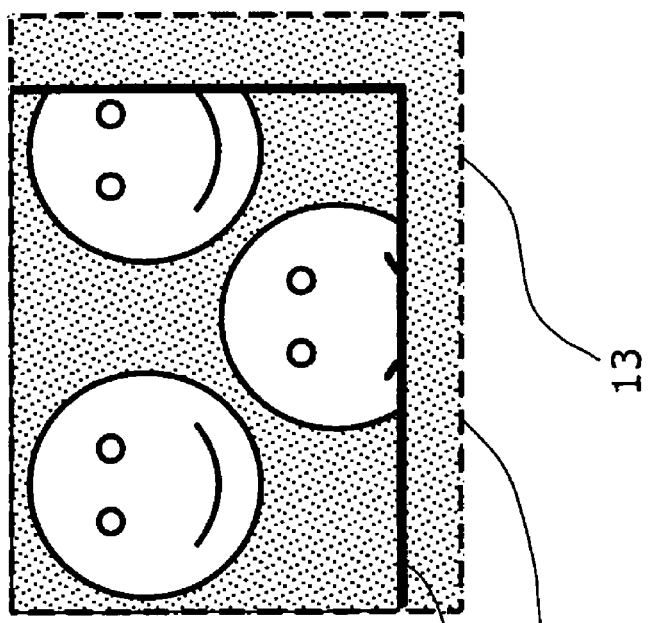
(b) Layout area < Object image data
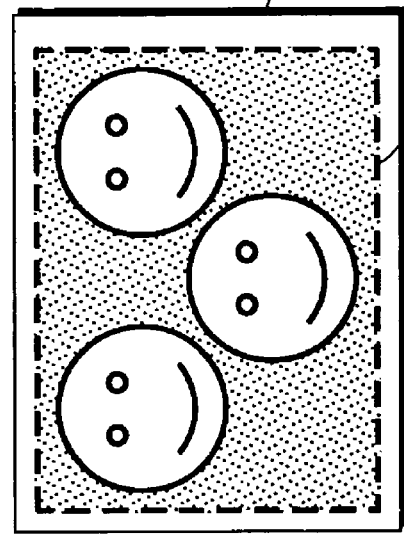
(a) Layout area > Object image data FIG. 13
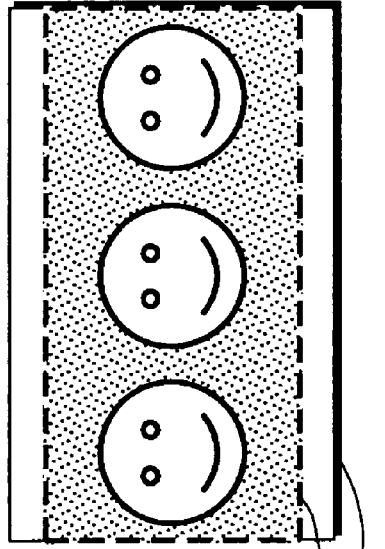
(c) Layout area > Object image data
width = 100%
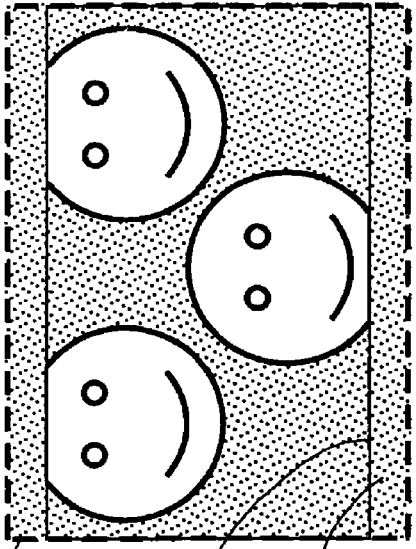
(d) Layout area < Object image data
width = 100%
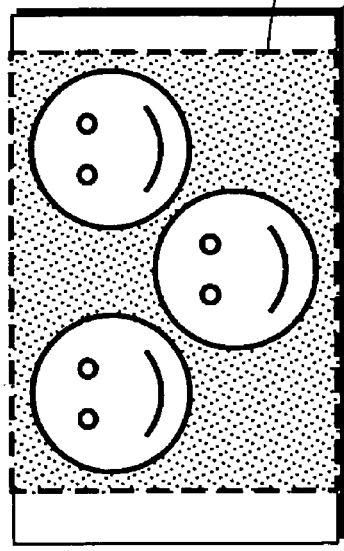
(a) Layout area > Object image data
height = 100%
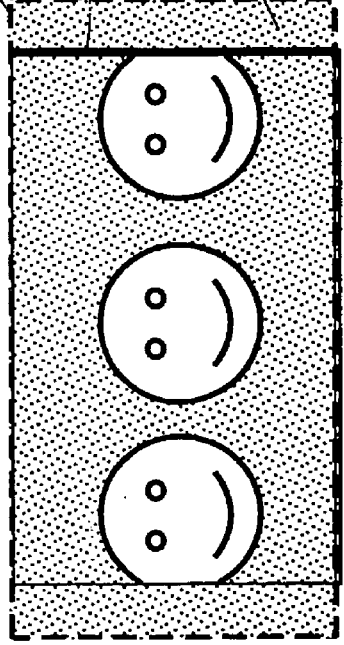
(b) Layout area < Object image data
height = 100%

FIG. 14

```
<html>
  <head>
    <title>title</title>
    <meta http-equiv="Content-Style-Type" content="text/css"/>
    <style type="text/css">
      @page yoko { size:127mm 89mm; margin:0;}    ──21
      div.yoko {page:yoko;}
      body{ padding:0;}
    </style>
  </head>
  <body>
    <div class="yoko" style="page-break-before:avoid">
      <img src="yoko.jpg" width="100%" />           ──26
    </div>
  </body>
</html>
```

(a) Layout area < Effective drawing area  (b) Layout area > Effective drawing area

FIG. 19

```
<html>
  <head>
    <title>title</title>
    <meta http-equiv="Content-Style-Type" content="text/css"/>
    <style type="text/css">
      @page yoko { size:297mm 210mm; margin-top:-6mm; frame:non }       — 27
      div.yoko {page:yoko;}
      body{ padding:0;}
    </style>
  </head>
  <body>
    <div class="yoko">
      <img src="yoko.jpg" width="100%" />                               — 28
    </div>
  </body>
</html>
```

FIG. 23

```
<html>
<head>
<title>title</title>
<meta http-equiv="Content-Style-Type" content="text/css"/>
<style type="text/css">
  @page yoko { size:297mm 210mm; margin:0; }
  div {font-size:16pt;}
  div.yoko {page:yoko;}
  body{ padding:0mm; }
  div.yokoR { page:yoko;margin-top:-10mm; text-align:right;}        31
</style>
</head>
<body>
<div class="ypkp">
  <img src="yoko.jpg" height="100%" />
</div>
<div class="yokoR" >2004.oo.xx</div>        32
</body>
</html>
```

FIG. 29
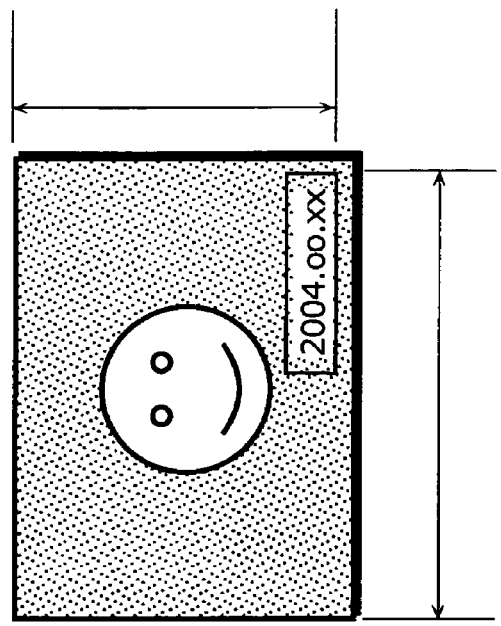
(b)
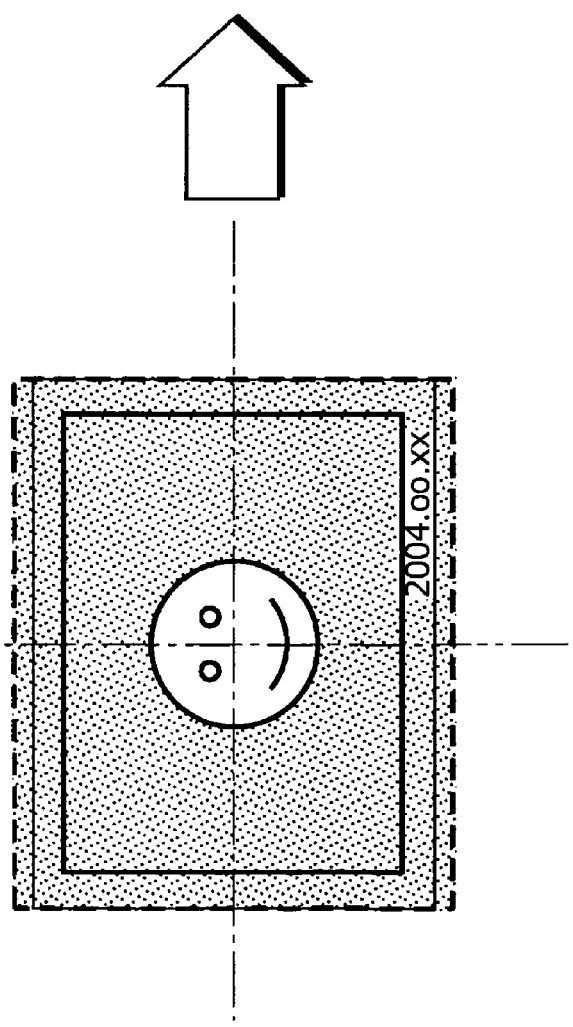
(a)

FIG. 32

```
<html>
  <head>
    <title>title</title>
    <meta http-equiv="Content-Style-Type" content="text/css"/>
    <style type="text/css">
      @page yoko { size:297mm 210mm; margin:0; frame:non;}   — 33
      div.yokoimg { page:yoko; width:315mm ; height:210mm ; margin-left: -9mm;}   — 34
      p-yokodate {position:absolute; width 292mm; bottom: 3mm; text-align:right; }   — 35
    </style>
  </head>
  <body>
    <div class="yokoimg">   — 36
      <img src="yoko.jpg" width:315mm />   — 37
    </div>
    <p class="yokodate" >2004.oo.xx</p>   — 38
  </body>
</html>
```

PRINTER

TECHNICAL FIELD

The present invention relates to a printing apparatus which analyzes print data written in a markup language such as XML, and prints object data.

BACKGROUND ART

Conventionally, printing with a printer almost always refers to printing from a personal computer (hereinafter referred to as PC). In the case of printing from a PC, printing in laser beam printers which are widely utilized in offices and the like is often realized using a language unique to printers, known as Page Description Language (hereinafter referred to as PDL). In this case, as shown in FIG. 1 for example, this is realized by providing, in a printer 305, a controller 303 which analyzes and converts a PDL 302 into data for printing. In the case of the PDL 302, very often text information is sent as a text code, and font data provided in the printer 305 is used.

Furthermore, most inkjet printers and the like which are widely used in ordinary households are, as shown in FIG. 2, exemplified by a printer 313 which is not equipped with a controller. In such a case, the majority have a printer-dedicated driver 312 installed in a PC 310, and bitmap data for printing is generated in the PC 310. The printer 313 just simply receives a print command and the bitmap-data-for-printing 310, and outputs on a print medium such as paper. This is done so that, by not providing font data and a controller, and by making data processing in the printer virtually unnecessary, a low-priced printer is realized.

Meanwhile, with the widespread use of digital still cameras (hereinafter referred to as DSC), recent years have seen the increasing popularity of printers which are, as shown in FIG. 3, equipped with a memory card slot, and able to print without passing through a PC, by connecting directly with a DSC. In the case of a printer that prints from the use of the memory card slot, the printer itself is equipped with a simple liquid crystal monitor and the like, and a print command 321 is sent from such user interface. Furthermore, a specification, known as DPOF, which describes printing control information in a specific file of a memory card is being standardized, and there are printers which automatically interpret the DPOF, internally create the print command 321, and perform printing. As a printer that can print by directly connecting with the DSC, PictBridge and the like, which performs printing by being directly connected via a USB cable and having the print command 321 sent using the user interface of the DSC, is being standardized. In all of these printing formats, data taken by the DSC and recorded in a memory card is converted into data for printing, using a controller 323 in the printer. Furthermore, such printing is customized for picture printing and, although a character string such as the date can also be printed, this is restricted to limited text information. For this reason, handling of print data that includes plenty of text information is difficult.

On the other hand, looking at the content to be printed, the host device carrying the print content has, up to this point, been only a PC. However, with the development of high functionality in various devices such as a portable phone, printing from such devices is becoming possible. In all of such devices, displaying of still pictures taken by a DSC, and connecting to the Internet and the like have become possible, and the handling of information which can be various print contents has become possible. With the popularization of ADSL and the like, the Internet connection environment has become common even in the ordinary household. As such, print contents have gone beyond still pictures, and are now spreading to include various information and services available in the Internet. In the Internet, XML-related languages such as HTML are widely used.

In addition, with Internet connection becoming common, various devices can now be linked to a network. Furthermore, to allow easy network connection for ordinary integrated devices not having the high-functionality as in a PC, specifications such as UPnP (Universal Plug and Play), for example, have been proposed. UPnP clearly stipulates the standard format for print content in the case of printing, and calls for the support of a specification known as XHTML-Print which is one type of XML-related language, as a standard.

In this manner, XML-related languages are spreading to various fields, and the trend towards XML standardization even with regard to print content is gradually rising. Seen from the content creation point of view, one reason for the widespread use is the high level of reusability and ease of revision of data in XML-related languages.

However, in order to realize the printing of XHTML-Print content for example, there is a need to realize a function for analyzing and converting XHTML-Print language into bitmap data for printing. For this purpose, the structure for either the processing in a host device as in the case of the inkjet printer, or the processing in the controller of a printer as in the laser beam printer is adopted. Recently, a format has been proposed in which the conversion into bitmap data for printing is performed in a server, and the bit map data is sent to the printer. However, printing resolution in recent printers has reached high levels, and the amount of bitmap data for printing required has become very large. Therefore, there is a concern that when the conversion into bitmap data for printing is carried out in a host device or a server and the bitmap data is transmitted to the printer, a large mass of data is made to flow through the LAN, which then becomes a bottleneck, thus reducing printing performance.

Furthermore, in the case where the conversion into bitmap data for printing is processed in a host device, as mechanical characteristics are different depending on the printer, there is a need to accommodate the characteristics of these individual devices. Conventionally, this is realized in a PC by installing a driver corresponding to a printer, every time the printer is changed. However, such a method is difficult to realize in the case of host devices, such as a portable phone and a digital AV device, which do not have a mechanism for the installation of software and accommodating the characteristics of peripheral devices.

On the other hand, as an example of processing in the printer, the performance of the conversion process in the printer has been proposed (for example, see patent reference 1). Patent reference 1 indicates an example in which broadcast data received using an STB (Set Top Box) is converted into a description that can be recognized by a printer. In addition, the performance of conversion of content information in the printer is mentioned.

Patent Reference 1: Japanese Laid-Open Patent Application No. 2001-237783

DISCLOSURE OF INVENTION

Problems that Invention is to Solve

In the case of converting, in the printer, XHTML-Print into bitmap data for printing, in the same way that display results for usual XHTML-Print browsers vary subtly depending on the browser, it is possible that printing results will also vary subtly for XHTML-Print, depending on the interpreting apparatus. Although, in the case of text-centered content, there is no problem even when the display result is slightly different, the variance of printing results according to the device is undesirable in the case where the object to be printed is only one, as in picture printing, or when a content requires layout uniqueness. However, although patent reference 1 discloses processing for display data, it does not go so far as to propose a method for accommodating the disparities in printers.

Furthermore, a format known as PDF (Portable Document Format) is widely used in PC's when importance is placed only on the layout of a content. However, in order to interpret then draw such PDF, the printer must posses the corresponding processing capability. Otherwise, the performance for converting into bitmap data for printing significantly deteriorates.

In particular, when Internet connection becomes normal in households, printing services for picture contents via the Internet, and printing application services and the like are realized. In reality, in some areas, such services have already been started. In addition, Internet connection is now becoming possible for devices other than a PC, such as a television and a portable phone, and it is also becoming possible to receive such services in such devices other than the PC.

In particular, in the case of printing from a PC when printing picture content, it is possible to print a so-called "bordered" picture in which the perimeter of the paper has a border area as shown in FIG. 4(a), and a so-called "borderless" picture in which the paper does not have a border portion as shown in FIG. 4(b), in the same manner as a conventional picture created through a DPE (Development Printing Enlargement) of a silver halide picture. In the PC, this is realized by generating, in the PC, respective bitmap data for printing and print commands for "bordered" printing use and "borderless" printing use, and transmitting these to the printer. Although this does not become much of a problem in the case of "bordered" printing", in the case of "borderless" printing, if data is not created to be somewhat larger than the printing paper, mechanical variations may not be accommodated and a white border portion may appear. In addition, how much larger the data needs to be generated depends on the machine type, and accommodating such areas as machine-type dependency is difficult in devices other than the PC. Furthermore, in the case of carrying out a service for distributing print data, it is difficult to send data which is suited to the characteristics of a printer, as it is not known what kind of printer is to be outputted to. Therefore, printing in which "bordered" or "borderless" is, as much as possible, indicated in the print content or print command is preferred.

Incidentally, for images shot by DSC, most have a 4:3 aspect ratio (vertical-horizontal ratio), and there some having ratios of 3:2, and 16:9. Furthermore, in portable phones, which are gaining rapid popularity in recent years, a 9:11 (portrait:landscape) aspect ratio such as CIF and QCIF are also used. Meanwhile, although specialized paper is typical for printing paper, the aspect ratios for these are varied. For example, the paper often used in pictures, known as L-format, is 127 mm:89 mm in size, while a postcard is 148 mm:102 mm, and the A4 paper often used in documents and the like is 297 mm:210 mm. For example, in the case of printing with PictBridge and the like, the difference in aspect ratios between the printing paper and print image can be randomly set in the printer. In other words, there is a possibility that the printing result may be different depending on the printer. Therefore, when printing is attempted in such a way that the aspect ratio of the object image is maintained and the image is not deleted, in the case of "bordered" printing, the border along the perimeter becomes uneven, as shown in FIG. 5(a) for example. Furthermore, in the case of "borderless" printing, an unnecessary border appears, as shown in FIG. 5(b).

Meanwhile, in print content written in XHTML-Print and the like, the location for drawing can be specified. However, the maximum range that is printable in "bordered" printing, and the scope of extra data that has to be prepared in "borderless" printing varies depending on the printer. Therefore, it is possible for the correlation of data between the drawing location and the printing location to change depending on the type of the printer.

As such, the present invention is conceived in view of the aforementioned circumstances, and has as an objective to provide a printing apparatus which can prevent surrounding borders from becoming uneven and unnecessary borders from appearing, and which can optimally print object data, even when the aspect ratio of the object data is maintained.

Means to Solve the Problems

In order to achieve the aforementioned objective, the printing apparatus according to the present invention is a printing apparatus which analyzes print data written in a markup language, and prints, onto a print medium, object data which is an object to be printed, the printing apparatus comprising: a layout area information obtainment unit which obtains layout area information specified by the print data, indicating a layout area on which the object data is to be laid out; an effective drawing area information obtainment unit which obtains effective drawing area information indicating a printing area which is dependent on the printing apparatus; a layout unit which lays out the object data onto the layout area based on respective sizes of the object data and the layout area, and lays out the layout area onto the effective drawing area based on respective sizes of the layout area and the effective drawing area; and a printing unit which prints the object data laid out on the effective drawing area by the layout unit.

Accordingly, even when the aspect ratio of the object data is kept maintained, it is possible to prevent surrounding borders from becoming uneven and unnecessary borders from appearing, and the optimal printing of the object data becomes possible.

Furthermore, it is also possible that the printing apparatus further includes a borderless print instruction detection unit which detects an instruction for borderless printing, wherein, when the borderless print instruction is detected, the effective drawing area information obtainment unit obtains a data area required in borderless printing, as the effective drawing area.

Accordingly, it is possible to optimally realize borderless picture image printing.

Furthermore, it is also possible that the printing apparatus according further includes a bordered print instruction detection unit which detects an instruction for bordered printing, wherein, when the bordered print instruction is detected, the effective drawing area information obtainment unit obtains a data-printable area as the effective drawing area.

Accordingly, it is possible to realize the printing of a picture image having even borders on all four sides irrespective of the aspect ratio of the object data.

Furthermore, it is also possible that the layout unit includes: a first magnification/reduction rate calculation unit which calculates a magnification rate or a reduction rate for the object data so that one of a height and a width of the object data is the same as with the layout area, and the other is the same or larger than with the layout area; a first layout unit which lays out the object data onto the layout area using the magnification rate or the reduction rate calculated by the first magnification/reduction rate calculation unit; a second magnification/reduction rate calculation unit which calculates a magnification rate or a reduction rate for the layout area so that one of a height and a width of the layout area is the same as with the effective drawing area, and the other is the same or larger than with the effective drawing area; and a second layout unit which lays out the layout area onto the effective drawing area using the magnification rate or the reduction rate calculated by the second magnification/reduction rate calculation unit.

Furthermore, it is possible that, when laying out the layout area onto the effective drawing area using the magnification rate or the reduction rate calculated by the second magnification/reduction rate calculation unit, the second layout unit lays out the layout area so that a top and a bottom or a left-side and a right-side of the layout area which extend beyond the effective drawing area are approximately even.

Accordingly, it is possible to realize picture image printing without offsetting the center of the picture.

Furthermore, it is possible that the second layout unit corrects the effective drawing area information so as to be smaller than the effective drawing area and of similar shape to printing paper, based on a similitude relation between the print medium and the effective drawing area, and the second magnification/reduction rate calculation unit calculate the magnification rate or the reduction rate for the layout area so that the layout area has a smallest size in which the effective drawing area corrected by the second layout unit is included.

Furthermore, it is also possible that the printing apparatus further includes a position obtainment unit which obtains position information specified by the print data, indicating a position at which a character string is to be superimposed on the object data, wherein the layout unit further includes: a character string superimposing position determining unit which determines a position at which the character string is to be superimposed, based on the position information obtained by the position obtainment unit, the magnification rate or the reduction rate calculated by the first magnification/reduction rate calculation unit, and the magnification rate or the reduction rate calculated by the second magnification/reduction rate calculation unit; a character string correction unit which corrects the position at which the character string is to be superimposed so that the character string is printed within a predetermined area of the print medium, in the case where the position at which the character string is to be superimposed extends beyond the print medium or comes close to a predetermined area away from an edge of the print medium, the position being determined by the position obtainment unit; and a character string layout unit which lays out the character string by superimposing the character string at the position at which the character string is to be superimposed on the object data, the position being corrected by the character string correction unit.

Accordingly, a character string to be printed together with the object data can be superimposed approximately on a specified location, without the character string being cut off.

Furthermore, it is also possible that the layout unit further includes a character string layout unit which magnifies or reduces a character string to be superimposed on the object data, using a magnification rate or a reduction rate which is different from the magnification rate or the reduction rate calculated by the first magnification/reduction rate calculation unit and the magnification rate or the reduction rate calculated by the second magnification/reduction rate calculation unit, and lays out the magnified or reduced character string by superimposing the character string on the object data.

Here, it is also possible that the printing apparatus further includes: a specified size obtainment unit which obtains a size of the print medium, specified by the print data or a print execution instruction; and a medium size obtainment unit which obtains a size of the print medium, used by the printing apparatus, wherein, in the case where the size of the print medium, specified by the print data or the print execution instruction, and the size of the print medium used by the printing apparatus are different, the character string layout unit is operable to calculate the magnification rate or the reduction rate for the character string based on the respective sizes of the print medium, and lays out the character string by superimposing the character string on the object data.

Accordingly, it is possible to provide picture printing which superimposes a character string without losing balance, even when using printing paper with a different size from the specified printing paper.

Furthermore, it is also possible that the print data further includes text information, the printing apparatus further includes: a character string layout unit which lays out the text information onto the layout area; and a character string layout correction unit which stores a size and a position laid out by the character string layout unit, and changes the size and the position into coordinates on the effective drawing area, and the printing unit superimposes the text information changed into coordinates by the character string layout correction unit, on the object data laid out on the effective drawing area by the layout unit, and prints the superimposed text information and the object data.

Accordingly, it is possible to realize borderless printing at a position specified by the print data. In addition, even when the aspect ratio of the print data changes, it is possible to draw text data such as the date, at a specified position corresponding to the printing paper, using the same XML description.

It should be noted that the present invention can be realized not only as such printing apparatus, but also as a printing method having, as steps, the characteristic units included in such printing apparatus, and also as a program which causes such steps to be executed in a computer. Furthermore, it goes without saying that such a program can be distributed via a recording medium such as a CD-ROM, and a transmission medium such as the Internet.

EFFECTS OF THE INVENTION

As is clear from the above-mentioned explanation, according to the printing apparatus in the present invention, even when the aspect ratio of the object data is kept maintained, it is possible to prevent surrounding borders from becoming uneven and unnecessary borders from appearing, and the optimal printing of the object data becomes possible. Accordingly, it becomes possible to analyze print data written in a mark up language such as XHTML-Print, and print a picture content with optimal layout even without the concern of a user, and in these days where the occasions in which printing is executed by having print data or a print command sent from a host device other than a PC are increasing, the practical value of the present invention is extremely high.

BRIEF DESCRIPTION OF DRAWINGS

FIG. 4 is a schematic diagram representing printing results for bordered printing and borderless printing.

FIG. 5 is a schematic diagram representing printing results for bordered and borderless printing in the case where the expression in a content is faithfully recreated.

FIG. 8 is a diagram showing an example of a description in XHTML-Print in the first embodiment of the present invention.

FIG. 11 is a diagram showing an example of a description in XHTML-Print in the first embodiment of the present invention.

FIG. 12 is a diagram showing the relation of XHTML-Print page boxes and image elements.

FIG. 13 is a diagram showing an actual layout for XHTML-Print page boxes and image elements.

FIG. 14 is a diagram showing an example of a description in XHTML-Print in the first embodiment of the present invention.

FIG. 19 is a diagram showing an example of a description in XHTML-Print in the first embodiment of the present invention.

FIG. 23 is a diagram showing an example of a description in XHTML-Print in the second embodiment of the present invention.

FIG. 29 is a diagram showing the outline diagram depicting the superimposition of the date, in the fourth embodiment of the present invention.

FIG. 32 is a diagram showing print data in the sixth embodiment of the present invention.

NUMERICAL REFERENCES

Figure 1:
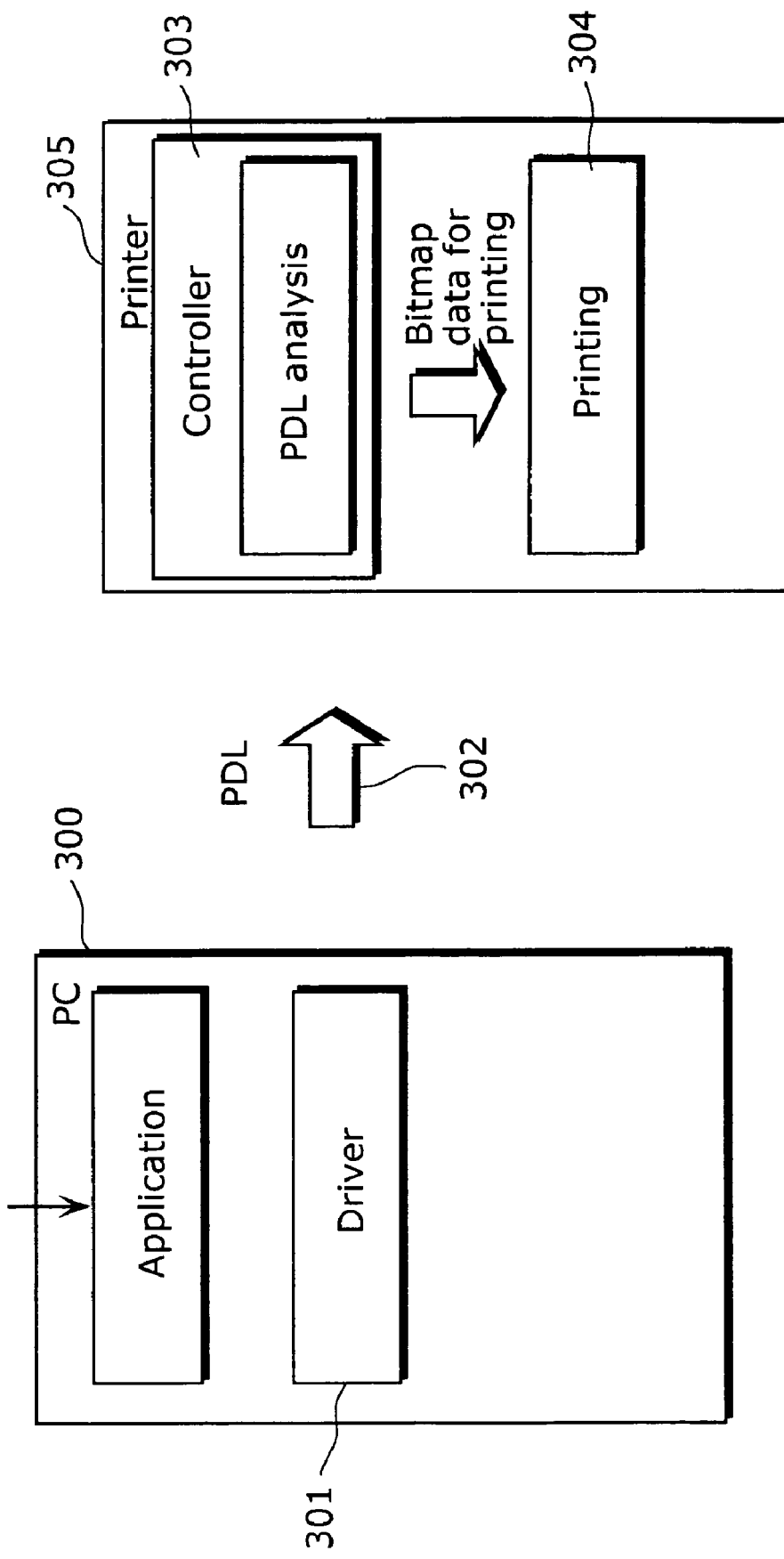
FIG. 1 is diagram of the outline structure of a conventional printer equipped with a controller.
Figure 2:
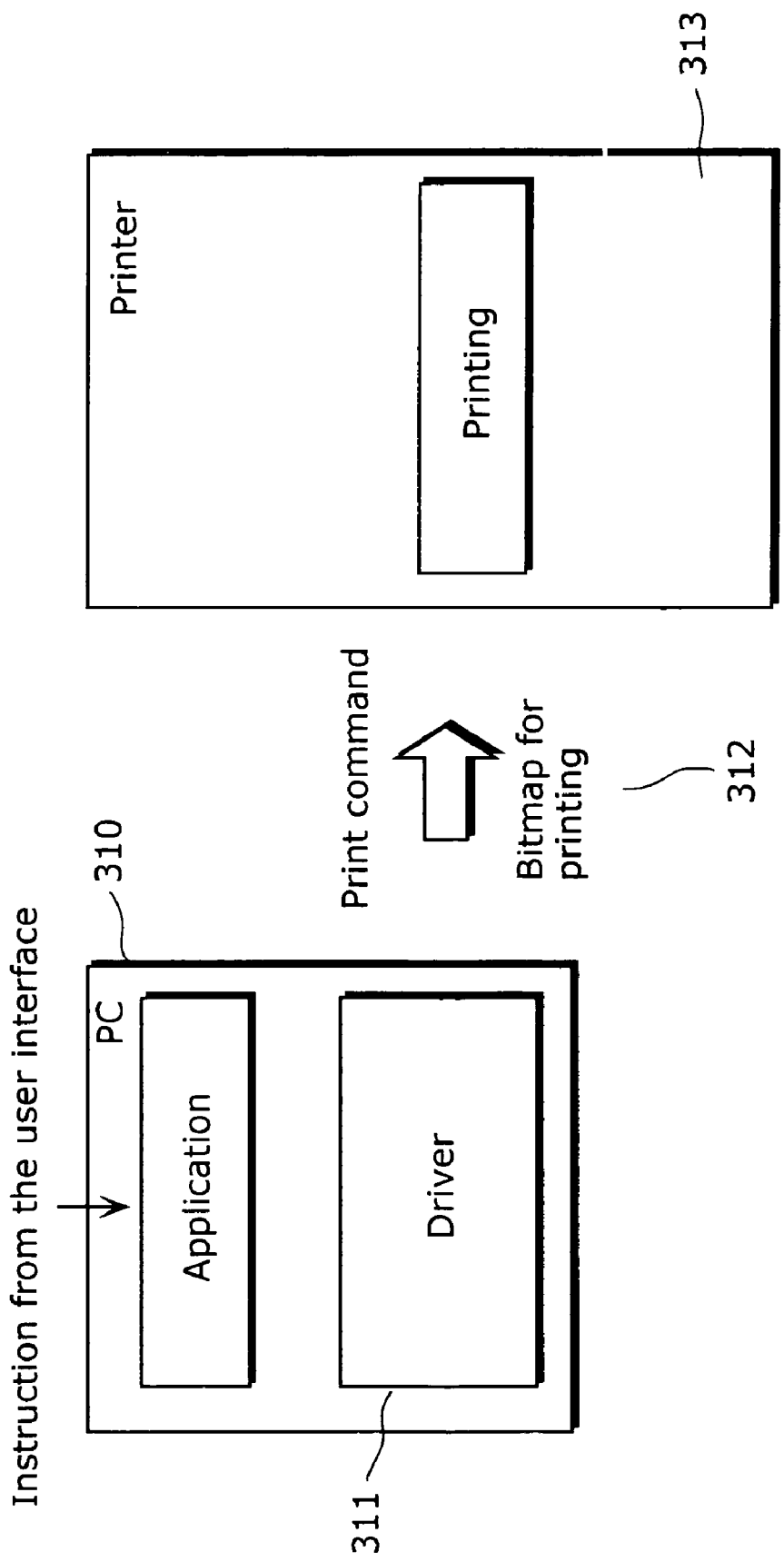
FIG. 2 is diagram of the outline structure of a conventional printer which is not equipped with a controller.
Figure 3:
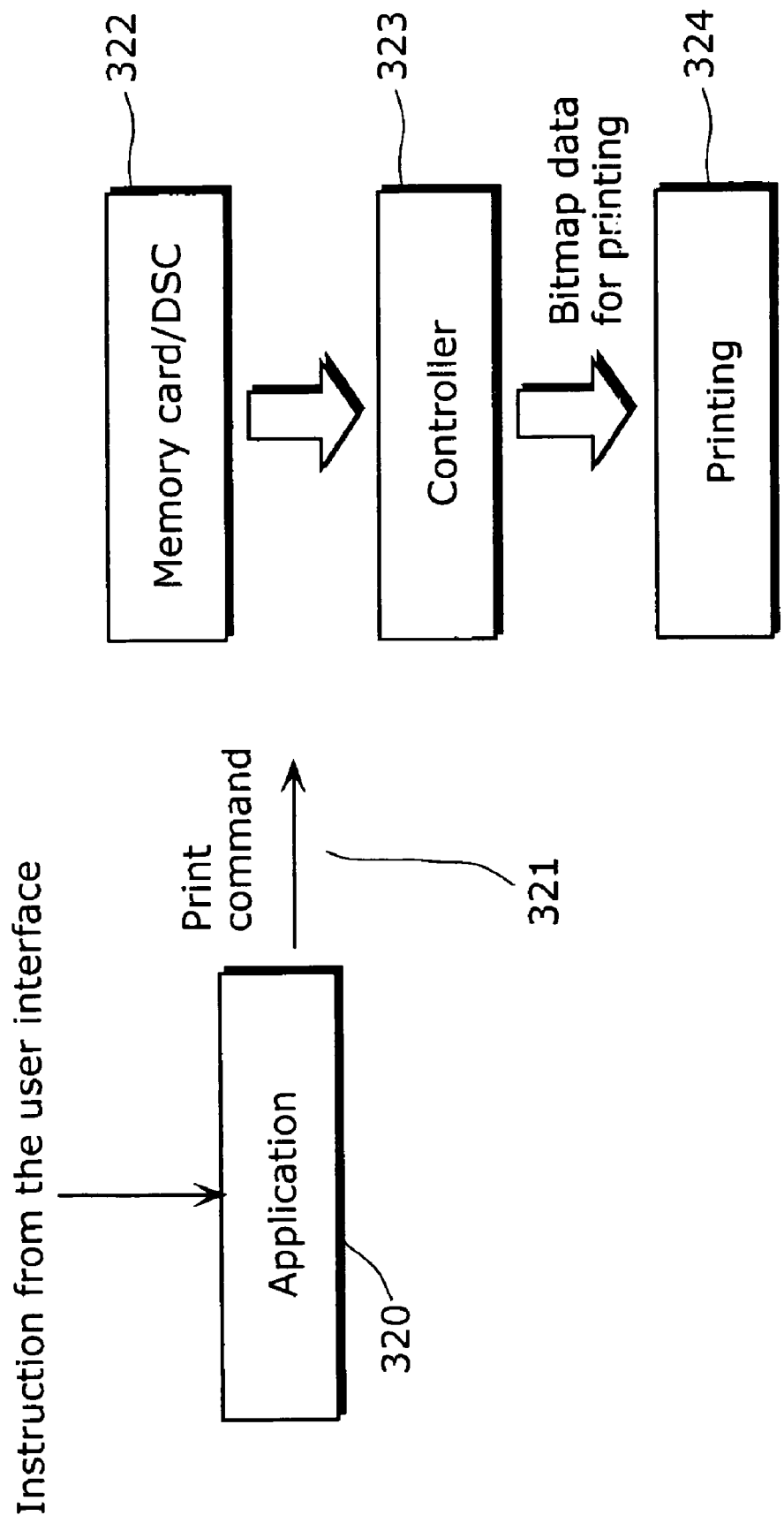
FIG. 3 is diagram of the outline structure of a conventional printer having a direct printing function, and which does not use a PC.

11 Layout area specified using a page box
12 Magnified/reduced object image
13 Magnified/reduced object image extending beyond the page box, which is to be deleted
15 Effective drawing areas which are individually different depending on the printing apparatus
16 Printing paper to be printed on
200 Printing apparatus
201 Communication unit
202 Command analysis unit
203, 210 Print data analysis unit
204, 220 Layout unit
205 Bitmap generation unit
206 Printing unit
2031 Object data obtainment unit
2032 Layout area information obtainment unit
2033 Effective drawing area information obtainment unit
2041 First magnification/reduction rate calculation unit
2042 First layout unit
2043 Second magnification/reduction rate calculation unit
2044 Second layout unit
2101 Position obtainment unit
2201 Character string position determining unit
2202 Character string correction unit
2203 Character string layout unit

BEST MODE FOR CARRYING OUT THE INVENTION

The respective embodiments of the present invention are hereinafter explained with reference to the diagrams.

First Embodiment

Figure 6:
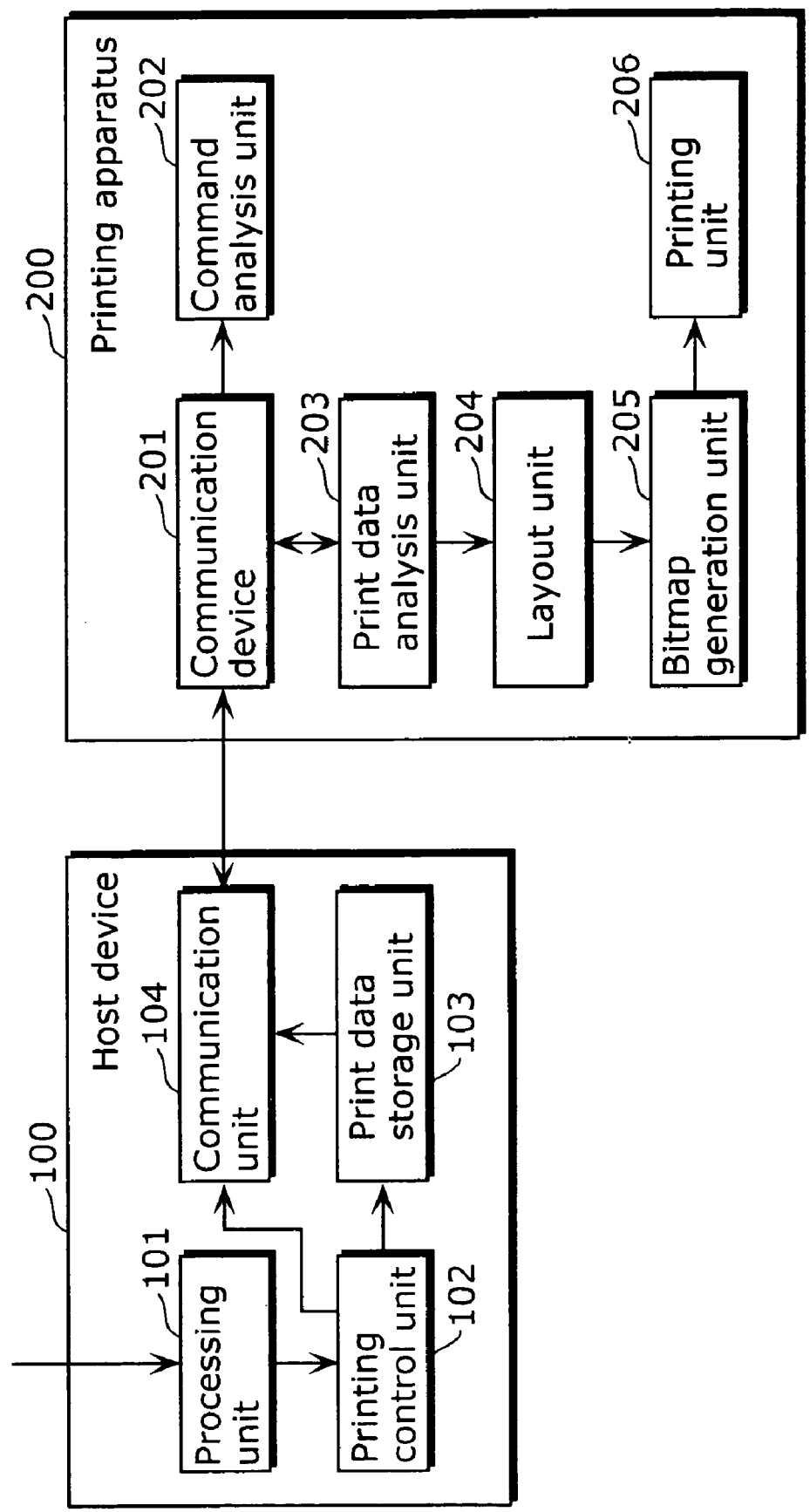
FIG. 6 is a block diagram showing the structure of the system using the printing apparatus according to the first embodiment.

FIG. 6 is a block diagram showing the structure of a system utilizing the printing apparatus according to the first embodiment of the present invention.

A host device 100 is an apparatus for outputting a command to execute printing, and as shown in FIG. 6, includes a processing unit 101, a printing control unit 102, a print data storage unit 103, and a communication unit 104.

The processing unit 101 is, for example, an application and the like, which receives, from a user, an instruction and the like, and carries out a print instruction. The printing control unit 102 is, for example, printing middleware and the like, which creates print data written, for example, in XHTML-Print, according to the print instruction from the processing unit 101. Furthermore, the printing control unit 102 issues a print command for a printing apparatus 200, according to the print instruction from the processing unit 101. The print data storage unit 103 holds the print data created by the printing control unit 102. The communication unit 104 transmits, to the printing apparatus 200, the print command issued by the printing control unit 102. In addition, in accordance with a request for print data from the printing apparatus 200, the communication unit 104 retrieves corresponding print data from the print data storage unit 103, and sends the retrieved data to the printing apparatus 200.

Note that although here the print data storage unit 103 holding the print data is included in the host device 100, the present invention is not limited to such configuration, and the print data storage unit 103 may be included in another device or it may be provided in another location. Furthermore, the form of connection may be on a 1 to 1 basis with the host device 100, or a connection to a network.

Meanwhile, the printing apparatus 200 is an apparatus (printer) for executing printing, and as shown in FIG. 6, includes a communication unit 201, a command analysis unit 202, a print data analysis unit 203, a layout unit 204, a bitmap generation unit 205, and a printing unit 206.

The communication unit 201 receives the print command transmitted from the host device 100. The command analysis unit 202 analyzes the print command, and requests the host device 100 for print data, via the communication unit 201. The print data analysis unit 203 analyzes print data written in XHTML-Print. The layout unit 204 lays out, on a layout area, object data which is the object to be printed, based on the size of the object data and the size of such layout area on which the object data is to be laid-out. Furthermore, the layout unit 204 lays out the layout area on an effective drawing area, based on the size of the layout area and the effective drawing area. The bitmap generation unit 205 generates bitmap data from the laid out data. The printing unit 206 prints and outputs the bitmap data generated by the bitmap generation unit 205 onto a print medium such as paper.

The outline of the operation of the system structured in the abovementioned manner shall be explained.

In the host device 100, when the processing unit 101 receives an instruction and the like from a user and carries out the print instruction, the printing control unit 102 issues a print command for the printing apparatus 200. At the same time, the printing control unit 102 creates print data written, for example, in XHTML-Print and stores the print data in the print data storage unit 103.

Upon receiving the print command, the printing apparatus 200 analyzes the print command, and requests the host device 10 for print data, via the communication unit 201. Subsequently, the host device 100 retrieves the print data requested by the printing apparatus 200 from the print data storage unit 103, and transmits this to the printing apparatus 200.

In the printing apparatus 200 which has received the print data: the print data analysis unit 203 analyzes the print data; and the layout unit 204 lays out object data onto a layout area and subsequently lays out the layout area onto an effective drawing area; and the bitmap generation unit 205 generates bitmap data from the laid out data. Subsequently, the printing unit 206 prints and outputs the generated bitmap data onto a print medium such as paper.

Figure 7:
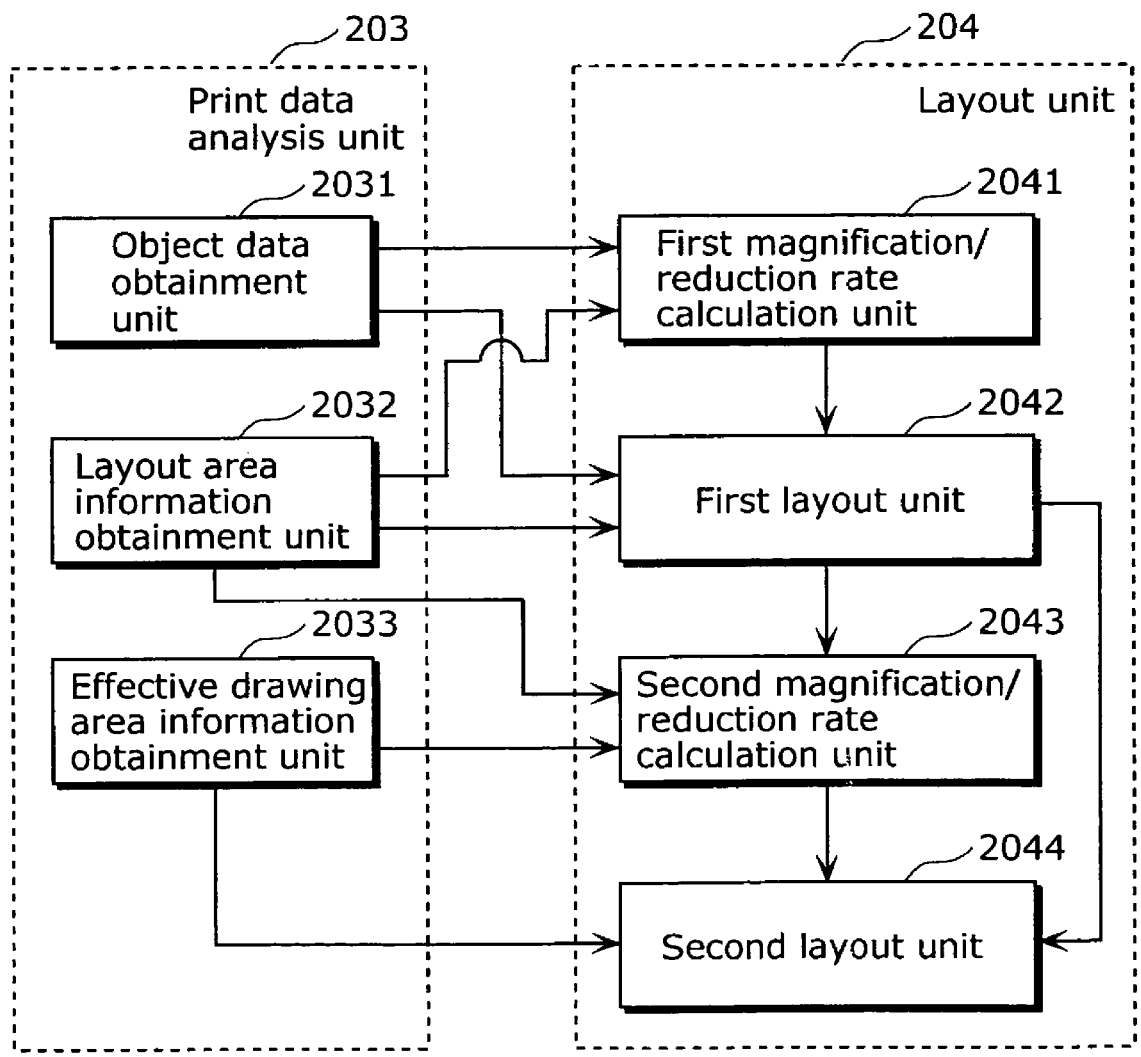
FIG. 7 is a block diagram showing the detailed structure of the print data analysis unit and the layout unit of the printing apparatus according to the first embodiment.

FIG. 7 is a block diagram showing the detailed configuration of the print data analysis unit 203 and the layout unit 203 of the printing apparatus according to the first embodiment of the present invention.

The print data analysis unit 203, as shown in FIG. 7, includes a object data obtainment unit 2031, a layout area information obtainment unit 2032, and an effective drawing area information obtainment unit 2033.

The object data obtainment unit 2031 obtains object data which is the object to be printed. The layout area information obtainment unit 2032 obtains layout area information specified by print data, which indicates a layout area. The effective drawing area information obtainment unit 2033 obtains effective drawing area information indicating a printing area which is dependent on the printing apparatus 200.

Meanwhile, the layout unit 204, as shown in FIG. 7, includes a first magnification/reduction rate calculation unit 2041, a first layout unit 2042, a second magnification/reduction rate calculation unit 2043, and a second layout unit 2044.

The first magnification/reduction rate calculation unit 2041 calculates a magnification rate or a reduction rate for object data so that one of the height and the width of the object data is the same as that of the layout area, and the other is the same or larger than that of the layout area. The first placement unit 2042 places the object data on the layout area according to the magnification rate or the reduction rate calculated by the first magnification/reduction rate calculation unit 2041. The second magnification/reduction rate calculation unit 2043 calculates a magnification rate or a reduction rate for the layout area so that one of the height and the width of the layout area is the same as that of the effective drawing area, and the other is the same or larger than that of the effective drawing area. The second layout unit 2044 lays out the layout area on the effective drawing area using the magnification rate or the reduction rate calculated by the second magnification/reduction rate calculation unit 2043.

Next, the analysis of print data and the laying out of object data shall be explained. However, first, the general relationship of the layout area and the object data is explained.

Figure 9:
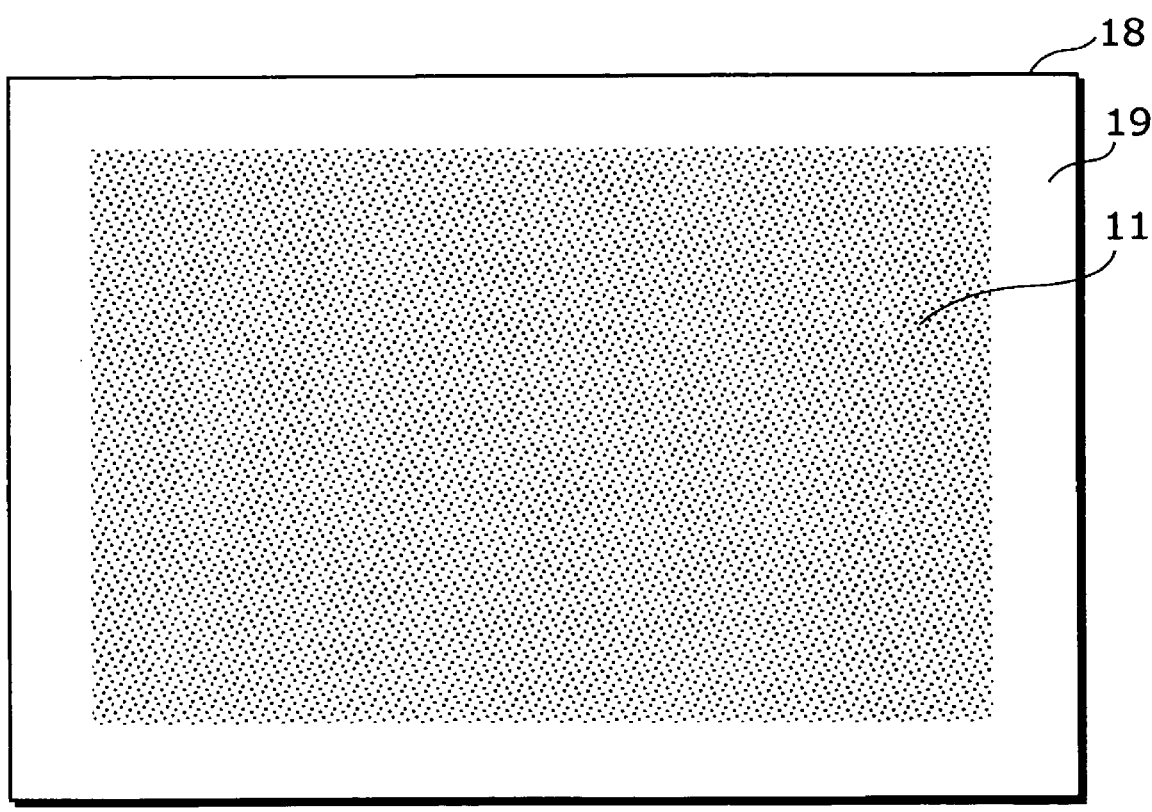
FIG. 9 is a diagram showing the structure of an XHTML-Print page box.

In XHTML-Print, the object data to be printed (object) and its layout information can be expressed separately. The layout information is expressed in a format known as CSS (Cascading Style Sheet). In order to realize picture-like printing in XHTML-Print, a description as shown in FIG. 8, for example, is made. Here, a box referred to as @page is used. This box, as shown in FIG. 9, represents an area describing elements to be drawn, and @page is a description called page box 18, used in a print medium and the like. The page box 18 is made up of a layout area 11 which can display details of the elements, and a border 19 found on the outer-side, on which nothing is displayed.

Figure 10:
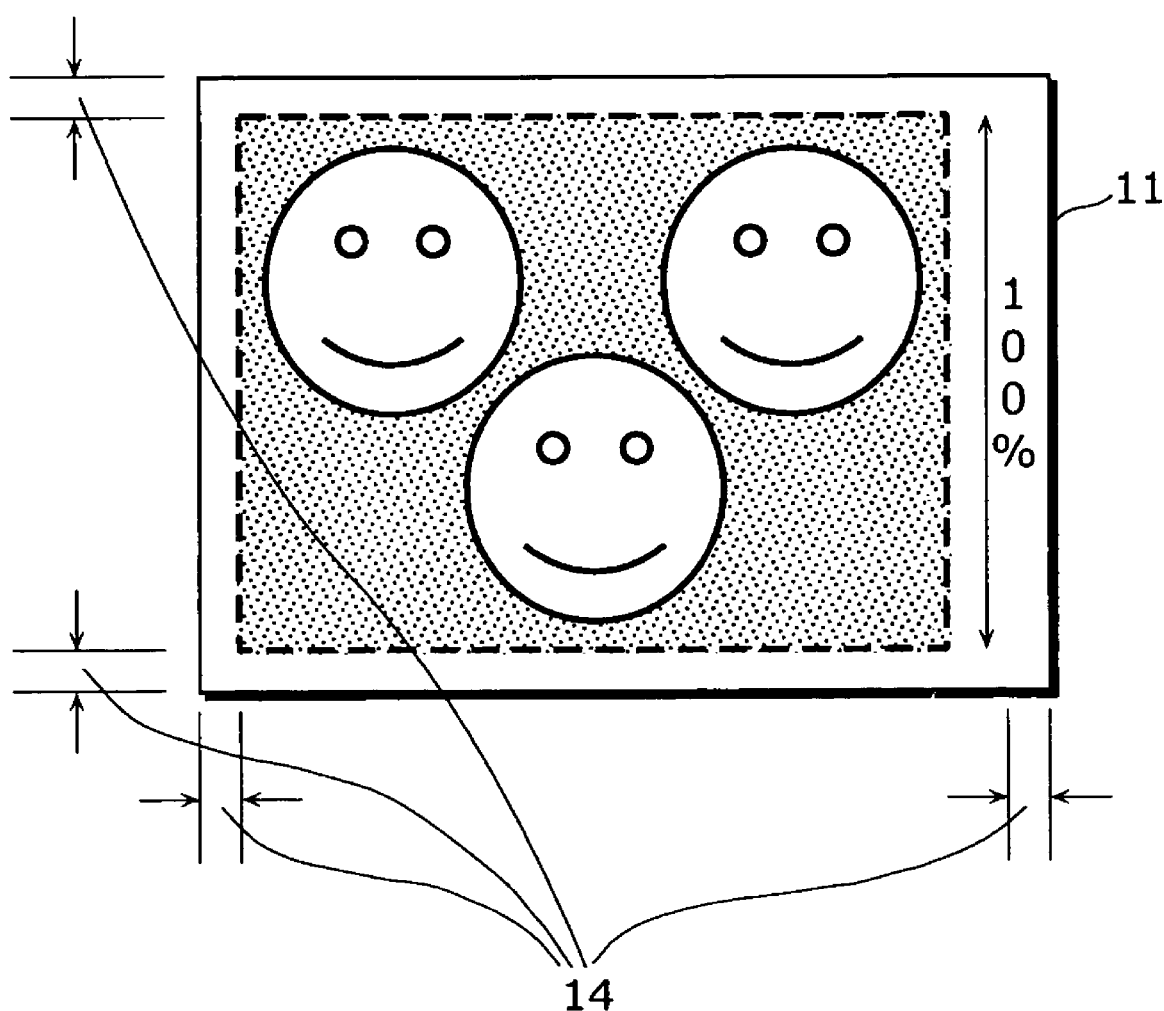
FIG. 10 is a diagram showing a typical printing result in the case where padding is included, in the first embodiment of the present invention.

A conventional device which interprets XHTML-Print first specifies the layout area 11 on which print information is laid out, according to a description 21 which is CSS layout area instruction information. Next, an object image 12 specified by <img> object is laid out within the layout area 11. The sample description in FIG. 8 is outputted as shown in FIG. 10. As shown in FIG. 10, a specified layout area size 11 is prepared, a 4 mm padding 14 (description 22) along the periphery of such area is secured, and drawing is carried out inside such area, with height being 100% and the aspect ratio being maintained (description 23). At this time, since there is no particular specification in the description in FIG. 8, deployment is carried out with the upper left as the starting point.

FIG. 11 is a different example of a description in XHTML-Print. In the sample description in FIG. 11, apart from not having a specification for the size of the object image (description 25), the layout area size 11 is also not specified (description 24). Therefore, in this case, the object image itself is applied, in its current size, as the size of the layout area.

In the case of a description such as that shown in FIG. 8, when the layout area 11 is the same or sufficiently larger than the size of the object image (object data) 12 specified by the <img> object, the object image 12 can be laid out without any problems, as shown in FIG. 12(a). However, when the size of the object image 12 is larger than the layout area 11, a portion 13 extending beyond the layout area 11 is not drawn, as shown in FIG. 12(b).

Although the <img> object is laid out with an upper left starting point in the case where there is no specification, by specifying a border 19, it is also possible to lay out the object image 12 on the center of the layout area 11. Here, by interpreting a negative value for the border 19, it is possible to even out the portion to be deleted. However, it is not possible to fit the entire object image 12. In other words, as shown in FIG. 8, when the size of the <img> object is specified, there are cases where, depending on the object image 12, the image is cut off.

For example, as shown in FIG. 8, when "height=100%" is specified, the height direction is adjusted to the layout area 11 and, with regard to the width direction, the aspect ratio of the object image 12 is maintained. In other words, in the case where the width of the object image 12 is smaller than the layout area 11 when the height direction of the object image 12 is made the same as the height of the layout area 11, the object image fits inside the layout area 11, as shown in FIG. 13(a). However, when the width of the object image 12 is greater than the width of the layout area 11, its width extends beyond the layout area 11 and this portion is deleted, as shown in FIG. 13(b).

In the same manner, as shown in FIG. 14, in the case where the size in the width direction is specified as "width=100%" (description 26), the layout is carried out, as shown in FIGS. 13(c) and (d), by adjusting the width direction to the layout area 11, and maintaining the aspect ratio of the object image 12.

Thus far, explanation has been carried out regarding the layout area 11 and the object image 12. Next, the drawing of the layout area 11 onto a display medium shall be explained. Here, since a printer is being considered, the display medium is assumed to be printing paper. Unlike the display of a computer, in the case of printing paper, advancing through the manipulation of the screen, known as scrolling, is not possible. Furthermore, in a printer the printable size varies subtly depending on the device. Therefore, subsequently, whether or not the aforementioned layout area 11 will fit in the printable size becomes a problem.

Figure 15:
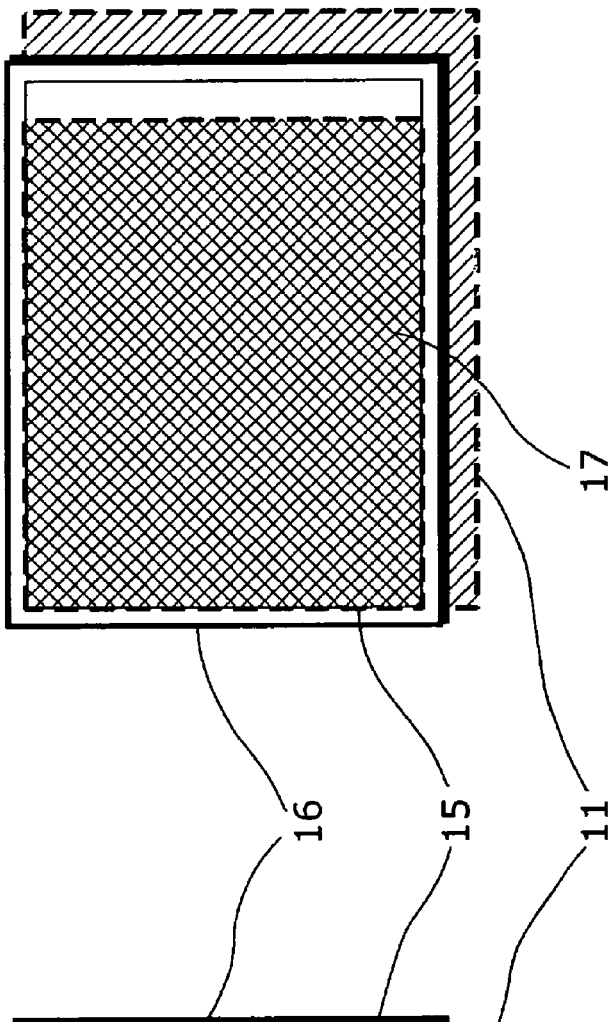
FIG. 15 is a diagram showing the relation of effective drawing areas and page boxes.

Here, the case where an effective drawing area 15 is small with respect to printing paper 16 is explained using FIG. 15. In the case where a specified layout area 11 is smaller than the effective drawing area 15, drawing is carried out in accordance to the position specification of the layout area 11, as shown in FIG. 15(a). In the case where the specified layout area 11 is larger than the effective drawing area 15, the image is generated and printed so as to fit in the effective drawing area 15 through rotation or reduction, as shown in FIG. 15(b). Such operations are disclosed in the CSS and XHTML-Print specifications, and guidelines are also indicated for the interpretation method for devices capable of interpreting XHTML-Print. The present operation also functions in the same manner even in the case where the object to be laid out is not a single item of image data.

Picture printing is now taken up in view of the aforementioned details. As previously mentioned, the aspect ratios of image data shot by a DSC and the paper to be printed on are different. As such, borders cannot be evened out, as in regular pictures, merely by normal printing. In order to print with approximately even borders, the subsequent process becomes necessary. Note that, here, a 4:3 landscape image is covered. Furthermore, as in FIG. 11, print data is a description which specifies the size of the printing paper as the size of the layout area 11.

Figure 16:
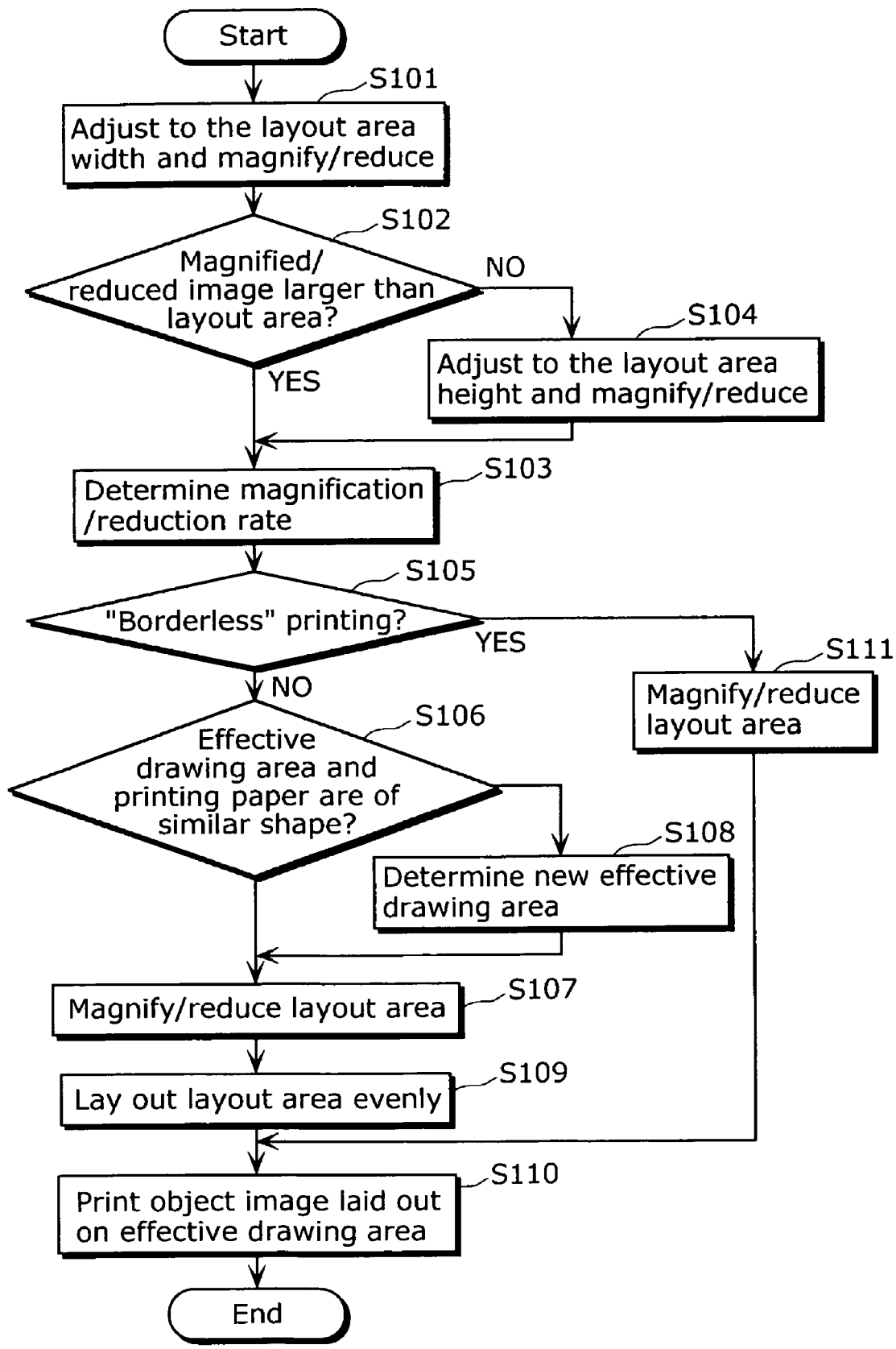
FIG. 16 is a flowchart showing the printing operation in the first embodiment of the present invention.
Figure 17:
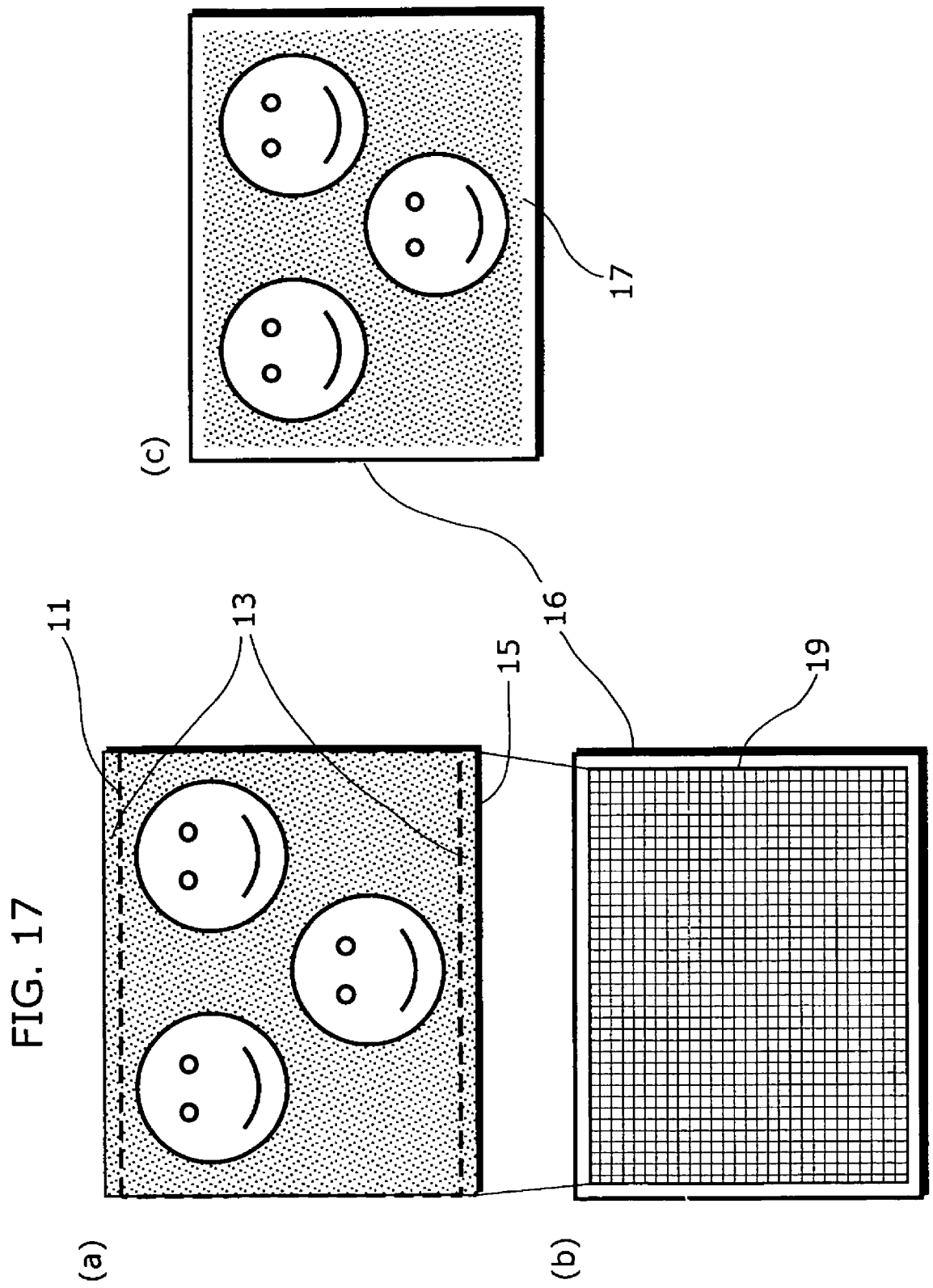
FIG. 17 is a diagram showing the relation of page boxes and image elements in the first embodiment of the present invention.
Figure 18:
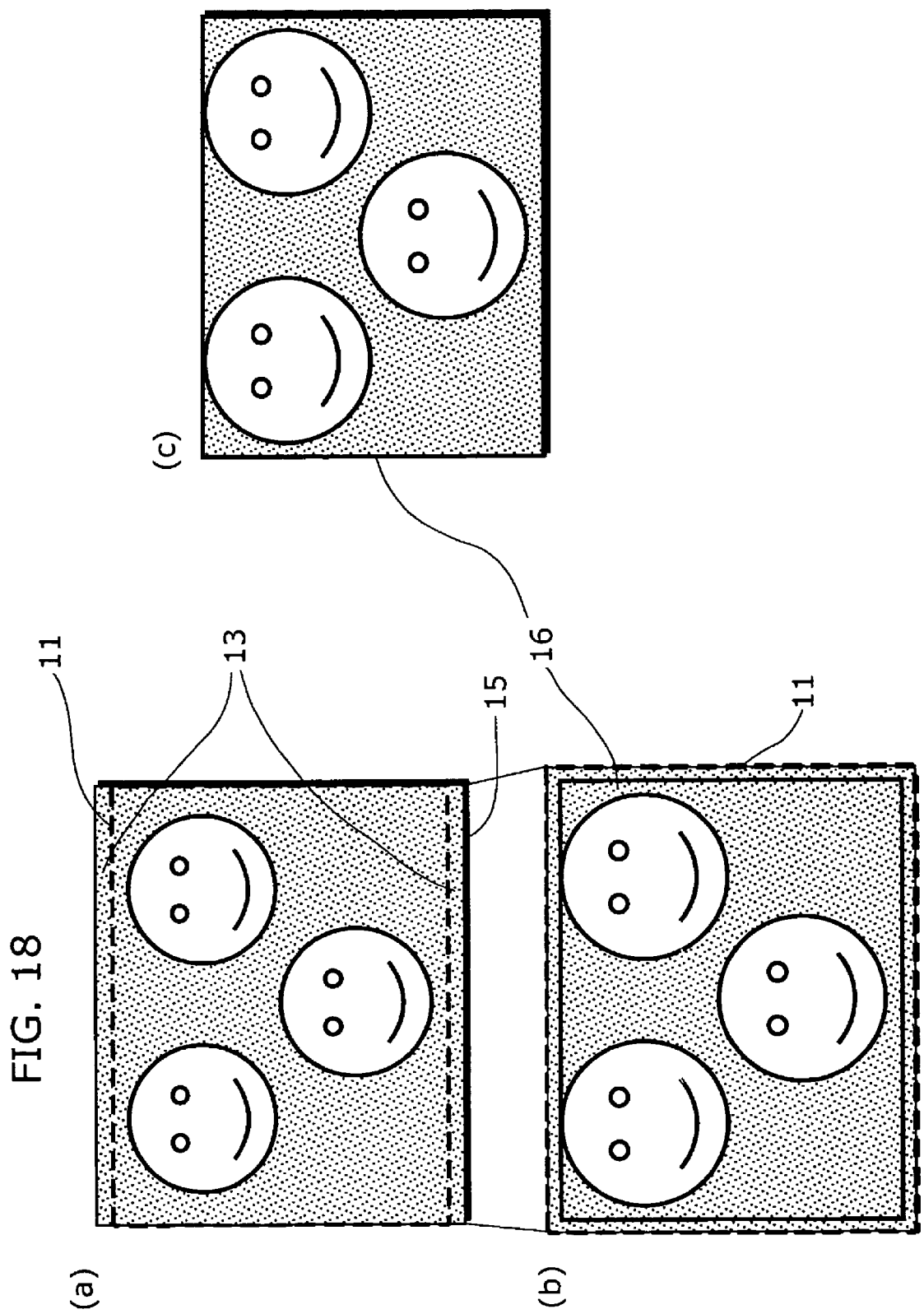
FIG. 18 is an outline diagram showing the flow of the borderless printing operation in the first embodiment of the present invention.

FIG. 16 is a flowchart showing the flow of the operation during printing in the printing apparatus. FIG. 17 is a diagram for explaining the layout in the case of "bordered" printing, and FIG. 18 is a diagram for explaining the layout in the case of "borderless" printing. Here, in the case of "bordered" printing, it is assumed that the effective drawing area 15 is smaller than the printing paper 16, and in the case of "borderless" printing, it is assumed that the effective drawing area 15 is larger than the printing paper 16.

First, the first magnification/reduction rate calculation unit 2041 adjusts the object image 12 to the width of the layout area 11 and magnifies/reduces with the aspect ratio being maintained as is, as shown in FIG. 15(a) and FIG. 18(a) (Step S101). Subsequently, it is judged whether or not the magnified/reduced image is the same or larger than the layout area 11 (Step S102). As a result, when the magnified/reduced image is the same or larger than the layout area 11 (Yes in Step S102), the first magnification/reduction rate calculation unit 2041 calculates the magnification/reduction rate used in the magnification/reduction in adjusting the object image 12 to the width of the layout area 11 (Step S103). Next, when a negative upper border is set in the print data, the layout is carried out from the portion extending, by the size of the border, beyond the layout area 11. Furthermore, in the case where the border is not specified but the print data has a description from which picture printing can be determined, the same operation can be performed as when centering in an up-down direction is carried out and a negative border is set.

On the other hand, when the magnified/reduced image is smaller than the layout area 11 (No in Step S102), the object image 12 is adjusted to the height of the layout area 11, and magnified/reduced in a manner in which the current aspect ratio is maintained (Step S104). Then the first magnification/reduction rate calculation unit 2041 calculates the magnification/reduction rate (Step S103).

Next, it is judged whether or not the print data requires "borderless" printing (Step S105). In the case where, as a result of such judgment, it is judged that "borderless" printing is not required, in other words, "bordered" printing is required (No in Step S105), it is judged whether or not the effective drawing area 15 is of a similar shape as the printing paper 16 (Step S106). In the case where, as a result of such judgment, the shape is not similar (No in Step 106), a largest possible new effective drawing area 19 which is smaller than the effective drawing area 15 and similar in shape to the printing paper 16 is determined (Step S108). At this time, the amount of upper, lower, left and right borders are made even. Next, as shown in FIG. 15(b), the second magnification/reduction rate calculation unit 2043 magnifies/reduces the layout area 11 so as to have the smallest possible size which includes the new effective drawing area 19 (Step S107). Subsequently, the layout is carried out so that the magnified/reduced layout area extending beyond the new effective drawing area 19 is even (Step S109). On the other hand, in the case where the shape is similar (Yes in Step S106), the second magnification/reduction rate calculation unit 2043 magnifies/reduces the layout area 11 so as to have the smallest possible size that includes the new effective drawing area 19 (Step S107). Subsequently, the layout is carried out so that the magnified/reduced layout area extending beyond the new effective drawing area 15 is even (Step S109).

Subsequently, the bitmap data for the object data 12 laid out on the effective drawing area 15 or the new effective drawing area 19 is generated and printed (Step S110). Furthermore, as shown in FIG. 15(c), a printing result having approximately even borders on all sides of the printing paper can be obtained. Note that in the present embodiment, since the print data specifies the size of the printing paper 16 as the size of the layout area, the new effective drawing area 19 also becomes a similar shape.

Thus far, explanation has been carried out with regard to the case of "bordered" printing. If enlargement of the borders in the aforementioned explanation is not objected to, there is a possibility that a response is possible with only a description in the print data. However, in the case of "borderless" printing, there are areas that cannot be handled through print data only. This is because, in "bordered" printing, when the layout area 11 is specified to be the size of the printing paper, it is certain that printing in an area which is smaller will be attempted. However, in "borderless" printing, the layout area 11 requires an area that is larger than the printing paper, and the extent by which it needs to be larger becomes dependent on the device. As such, it is difficult to determine the extent of the layout area 11 that needs to be specified in the print data. The operation in the case of "borderless" printing shall be explained hereinafter.

FIG. 19 is an example of print data for "borderless" printing. In FIG. 19, the size of A4 paper is assumed as the layout area, and "borderless" is expressed through a "border" property (description 27). This method of expression is not set as being standard, and other descriptions are also possible. Furthermore, it may also be notified as a print command.

More specifically, in the case where, as a result of the aforementioned judgment for whether or not the print data requires "bordered" printing, it is judged that "bordered" printing is required (Yes in Step S105), the layout area 11 is laid out on the effective drawing area 15, as shown in FIG. 18(b) (Step S111). Subsequently, bitmap data for the object image 12 laid out on the effective drawing area 15 is generated and printed (Step 5110). Subsequently, as shown in FIG. 18(c), a printing result in which the portion outside the printing paper 16 is cut off is obtained.

By operating in the aforementioned manner, although there is some degree of cutting off in the case of "borderless" printing, it is possible to obtain a printing result in which borders are approximately even on all sides, as in DPE. Furthermore, in the case of "borderless" printing, it is possible to avoid a situation where the drawing area is too small such that borders appear, or inversely, the situation where the drawing area is larger than required so that the area that cannot be printed becomes too large, and "borderless" printing at an optimal size can be realized.

Note that, although there are cases where rotation becomes necessary as, in actuality, the scanning direction of the printer and the scanning direction of the object image do not always match, explanation shall be omitted as this has no relation to the present invention.

Furthermore, "print data" refers to data describing details to be printed, which is transmitted from the host device and written in a description language such as XHTML-Print. Although, in the present embodiment, the print data is explained as being in XHTML-Print, the present invention is not limited to such language, and as long as it is an XML-related language that can describe a layout, it is possible to respond using the same method.

Furthermore, although in the present embodiment, the requirement for "borderless" printing is detected from the print data, it should be obvious that the same effect can be obtained even when "borderless" printing is instructed from a control system such as a print command.

Second Embodiment

In the first embodiment, the layout was carried out without considering the relative relation of the object image and the printing paper. However, taken from the content providing-side, it is preferable that, as much as possible, in the case of a content such as a picture, printing should be carried out with centers being aligned. In other words, regardless of the relative relation of the effective drawing area and the printing paper, it is preferable that the layout is carried out in such a way that the center of a print content is the center of the printing paper. However, in the case of borderless printing, whether or not the amount of the effective drawing area extending beyond the printing paper is set to be even on all four sides is dependent on the type of device. The possibility that, depending on circumstances, the amount extending beyond may be of different sizes for all four sides cannot be denied. In view of this, in the present embodiment, a method which can realize ideal borderless printing by aligning centers shall be explained.

Figure 20:
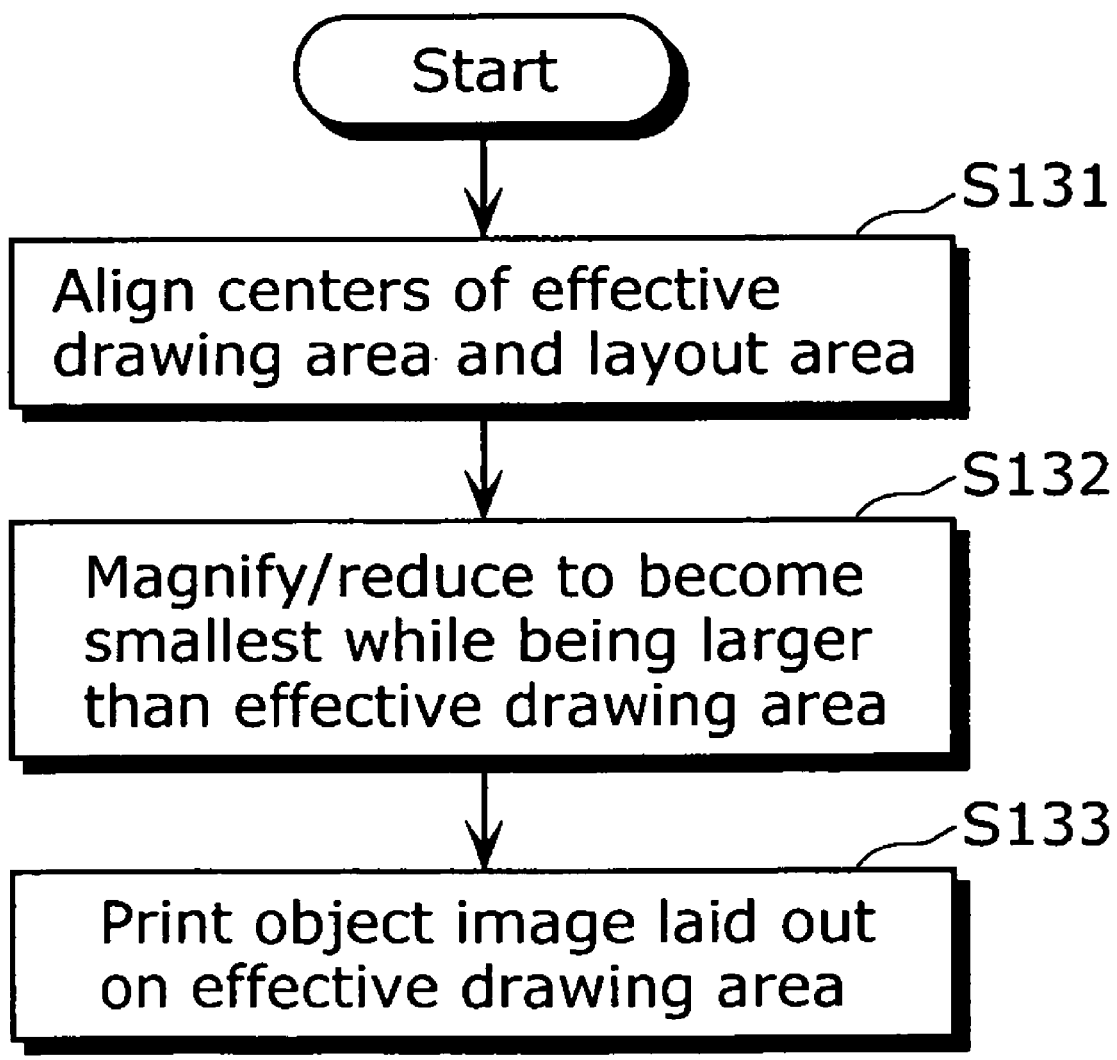
FIG. 20 is a flowchart showing the printing operation in the second embodiment of the present invention.

FIG. 20 is a flowchart showing an operation in the second embodiment. As the relationship of the layout area 11 and the object image 12 are the same as in the first embodiment, explanation shall be omitted.

Figure 21:
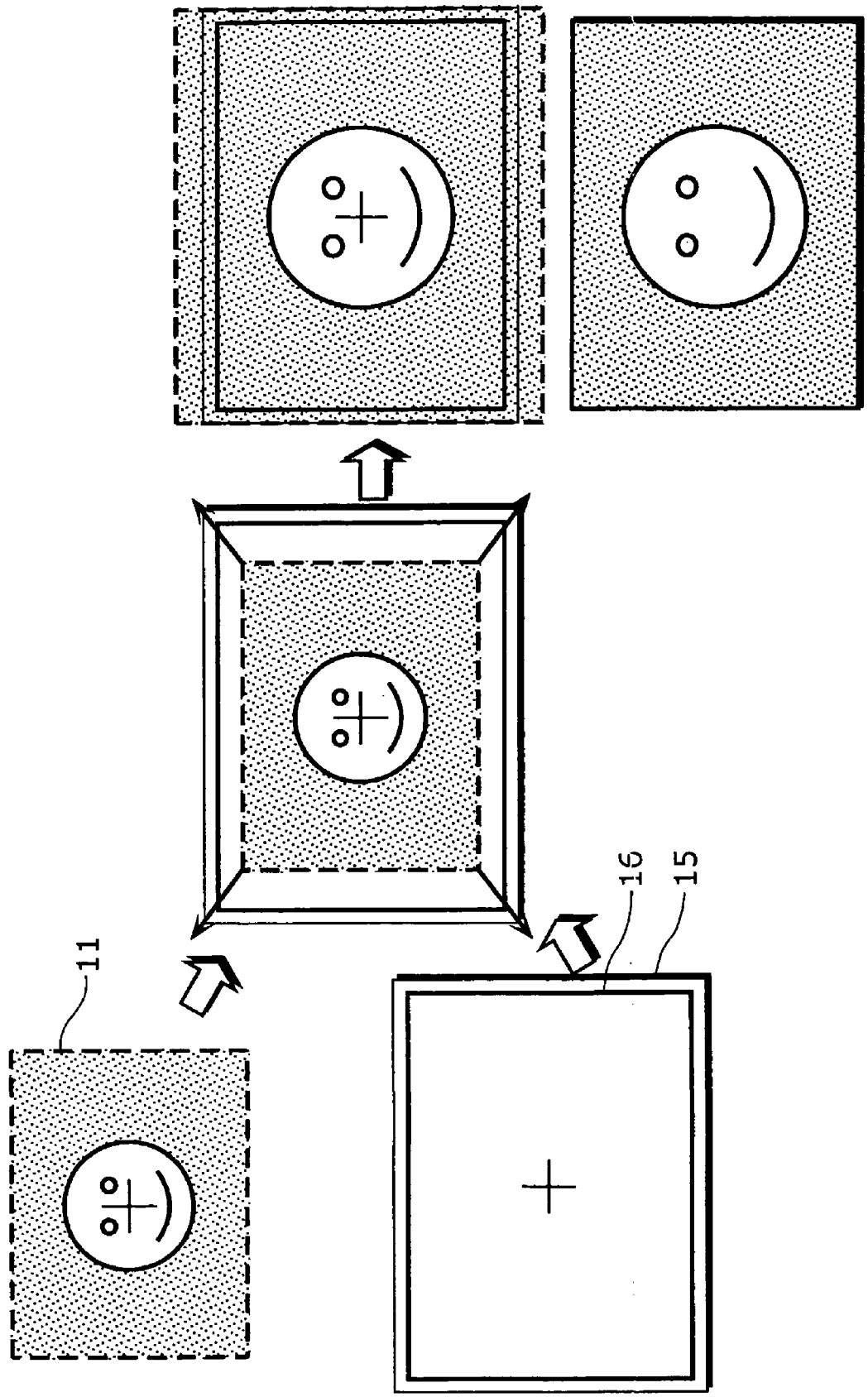
FIG. 21 is an image diagram showing the printing operation in the second embodiment of the present invention.
Figure 22:
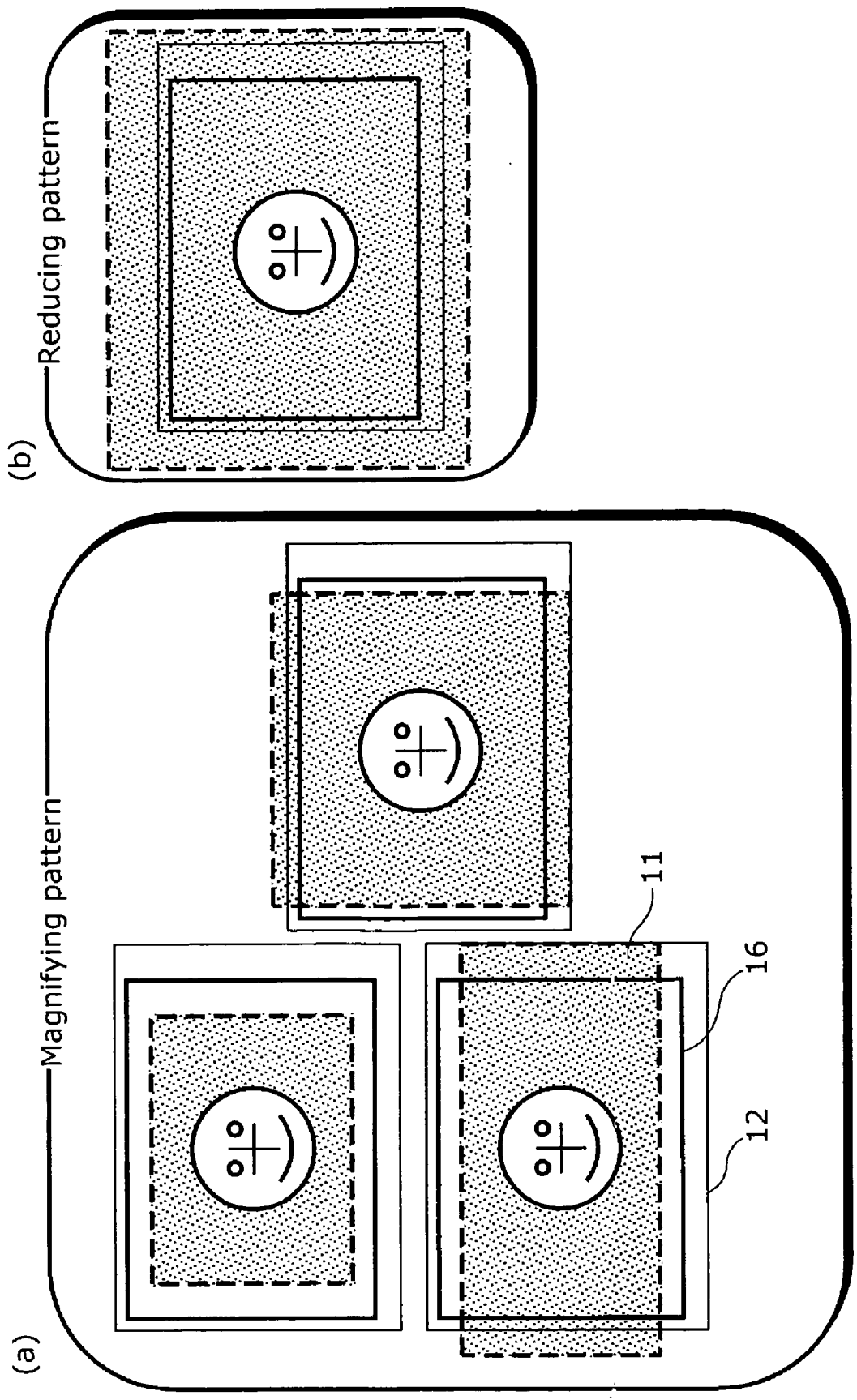
FIG. 22 is a diagram showing classifications for the magnification/reduction patterns in the second embodiment of the present invention.

First, upon detecting from a content that "borderless" printing is required, the second magnification/reduction rate calculation unit 2043 carries out the lay out so that the center of the printing paper 16 and the center of the layout area 11 overlap, as shown in FIG. 21 (Step S131). Next, using the center of the layout area 11 as the starting point, the second magnification/reduction rate calculation unit 2043 magnifies/reduces the layout area 11 while maintaining the aspect ratio as is, so that the layout area is at its smallest while being larger than the effective drawing area 15 (Step S132). In actuality, the respective long sides and short sides of the layout area 11 and the effective drawing area 15 are compared, and in the case where both the long sides and short sides of the layout area are larger, the layout area is reduced, as in FIG. 22(b). In all other cases, the layout area is magnified as shown in FIG. 22(a). In the case of reduction, the reduction rate for the short sides and long sides are compared, and the reduction rate having a higher numeric value, in other words, the reduction rate requiring a lower percentage of reduction is adopted, and the entire area is reduced. In the case of magnification, the magnification rate of the short sides and long sides are compared, and the magnification rate having the smaller numerical value, in other words, the magnification rate requiring a lower percentage of magnification is adopted, and the entire area is reduced. The portion extending beyond the effective drawing area as a result of the magnification/reduction process is discarded as being unnecessary data (Step S133).

In this manner, by carrying out the magnification/reduction process with the centers being aligned, borderless printing can be realized with the aspect ratio being maintained as is. In actuality, the same effect can be attained even without aligning the centers, by calculating the image edges from the center, and calculating coordinates in terms of the effective drawing area, the layout area and the object image.

Third Embodiment

The previous embodiment assumes the case where there is only one image data. In the present embodiment, explanation shall be made regarding the operation in printing with random text information such as date information being added over an image. Here, "text information" refers to information that should be printed as a character string included in print data.

Figure 24:
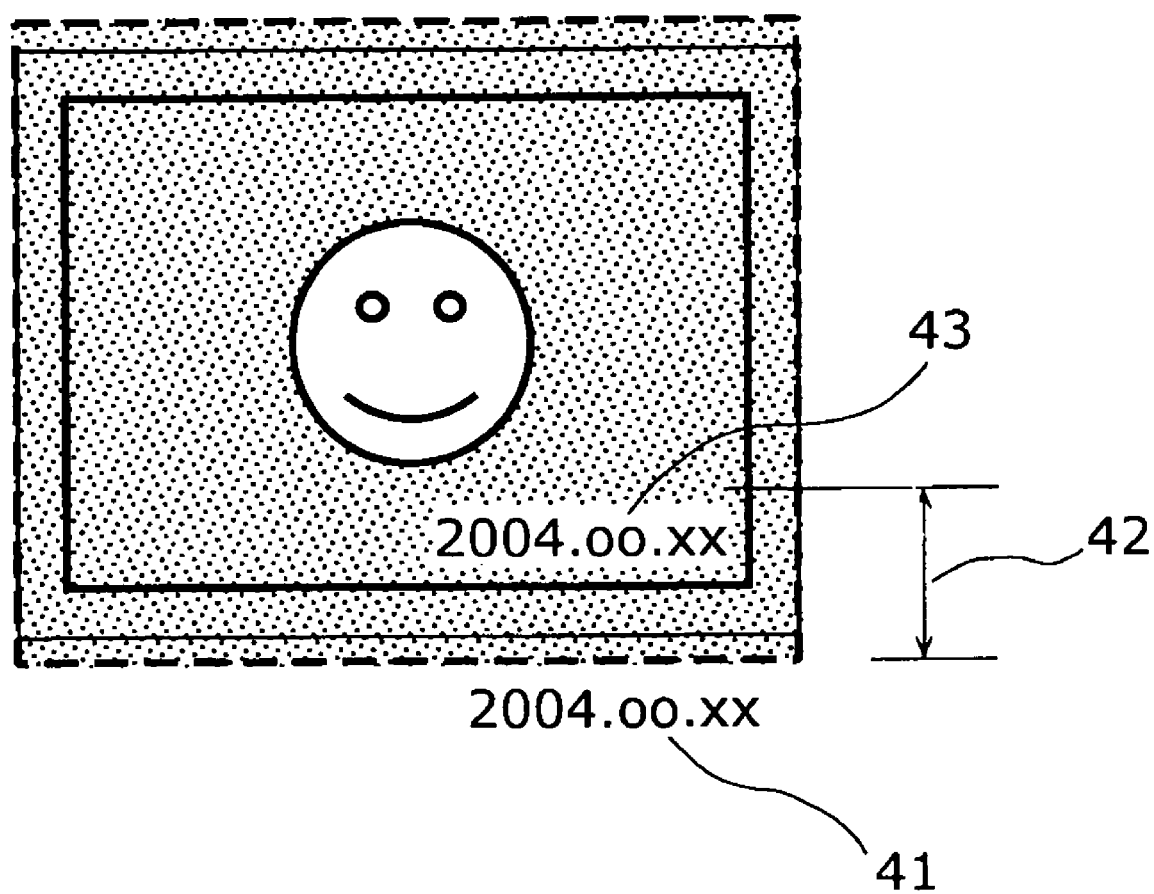
FIG. 24 is a diagram showing a typical printing result for the superimposition of the date, in the third embodiment of the present invention.
Figure 25:
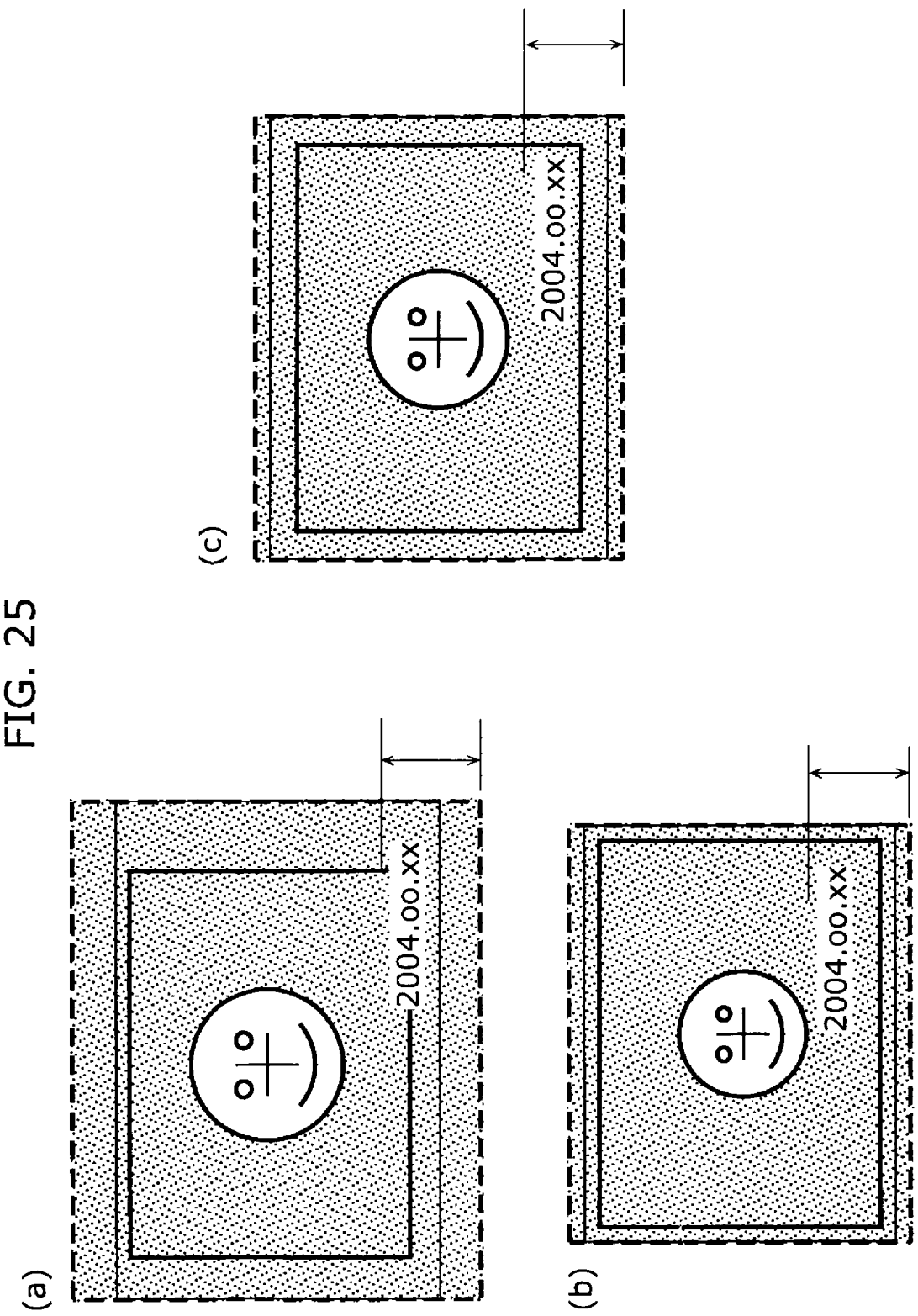
FIG. 25 is a diagram showing defective results for the superimposition of the date, in the third embodiment of the present invention.

FIG. 23 is an example showing a description for a picture content to be printed, in the present embodiment. In the case of placing text characters on top of an image in XHTML-Print, this can be realized either by handling the image as a background or, as shown in FIG. 23, by making a specification so that a negative border is specified for the character string (description 31), and after an image is created, the text characters are drawn from above. However, when handling the image as a background, the perception changes depending on how the image, which is the main item, is described. Moreover, there is also the demerit of the content being hard to make out. On the other hand, when the border is not specified in the description shown in FIG. 23, the text characters are laid out in a position 41 which is below where the object image is laid out, as shown in FIG. 24. However, by setting a negative border 42 in the upward direction for the character string (description 31), it is possible to lay out the character string in a position 43 on top of the object image, as shown in FIG. 24. However, as already mentioned, how the lower edges of the printing paper and the object image will turn out is dependent on the device. Therefore, when responding with such a description, it is possible that the date which is intended to be laid out at the bottom right is cut off as shown in FIG. 25($a$), or written at an excessively high position as shown in FIG. 25($b$). Moreover, in the examples shown in FIG. 25, although it is described as if the position is moved upward by the same size as the negative border amount, since the magnification/reduction rate at which the layout area 11 is magnified/reduced up to the effective drawing area 15 is multiplied, the position at which the date is laid out from the bottom edge of the image after magnification/reduction is actually different for the respective patterns.

In view of this, in the present embodiment, explanation is made regarding printing with random text information such as date information being added at the appropriate position on top of an image.

Figure 26:
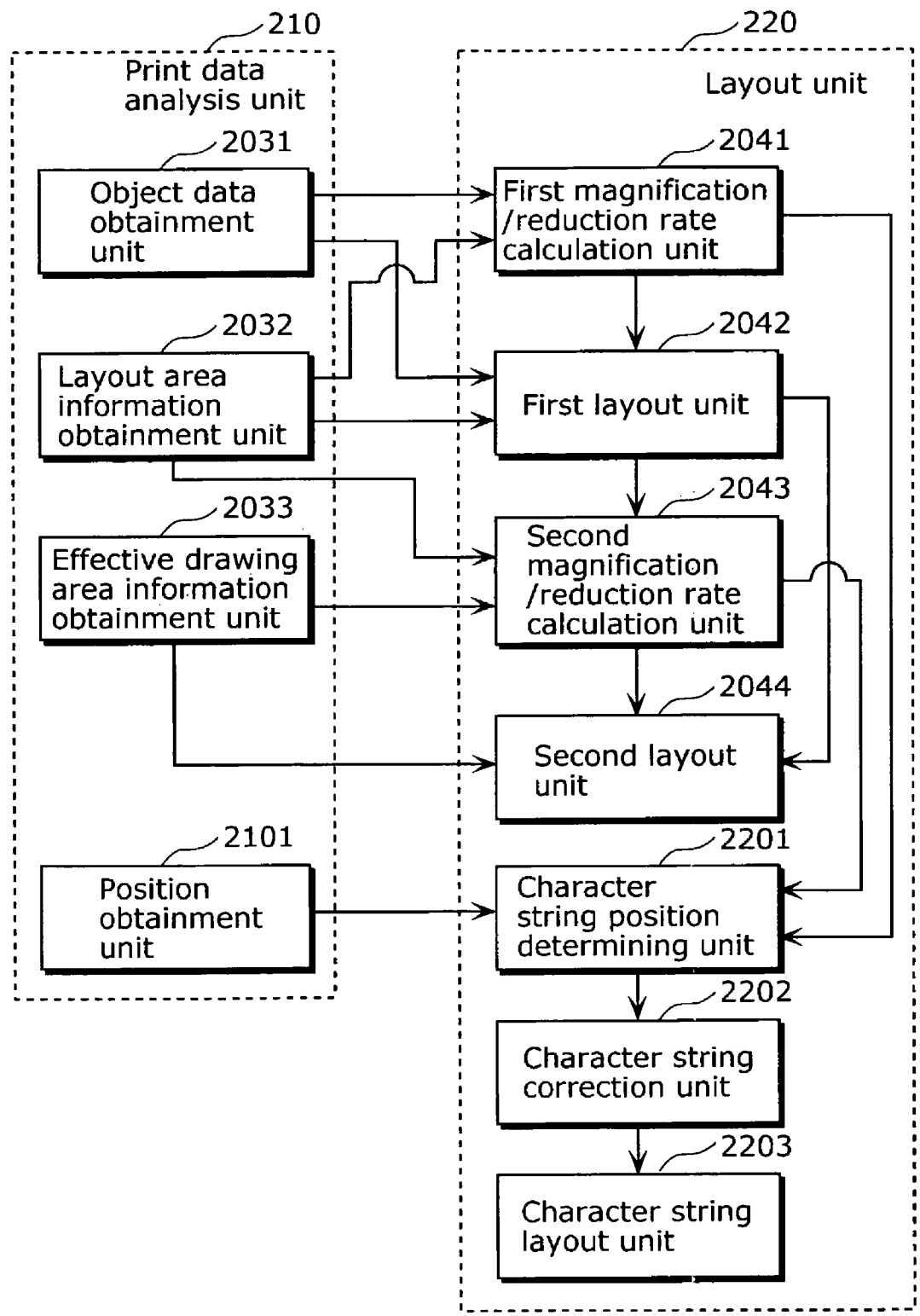
FIG. 26 is a block diagram showing the detailed structure of the print data analysis unit and the layout unit of the printing apparatus according to the third embodiment of the present invention.

FIG. 26 is a block diagram showing the detailed structure of the print data analysis unit and layout unit of the printing apparatus according to the third embodiment. Note that the same reference numbers are assigned to units which are the same as in the structure in the first embodiment, and their explanation is omitted.

The print data analysis unit 210 includes a position obtainment unit 2101 in addition to the structure in the first embodiment. Furthermore, the layout unit 220 includes a character string position determining unit 2201, a character string correction unit 2202, and a character string layout unit 2203, in addition to the structure in the first embodiment.

The position obtainment unit 2101 obtains position information specified by print data, which indicates a position at which a character string is to be superimposed on the object data. The character string position determining unit 2201 determines the position at which the character string is to be superimposed, based on the position information obtained by the position obtainment unit 2101, the magnification rate or the reduction rate calculated by the first magnification/reduction rate calculation unit 2041, and the magnification rate or the reduction rate calculated by the second magnification/reduction rate calculation unit 2043. In the case where the character string superimposing position determined by the character string position determining unit 2201 extends beyond the printing paper, or approaches a predetermined range away from the edge of the printing paper, the character string correction unit 2202 corrects the character string superimposing position so that the character string is printed within a predetermined range on the printing medium. The character string layout unit 2203 lays out the character string by superimposing the character string on the object data, at the superimposing position corrected by the character string correction unit 2202.

Next, the operation of the printing apparatus structured in the abovementioned manner shall be explained.

Figure 27:
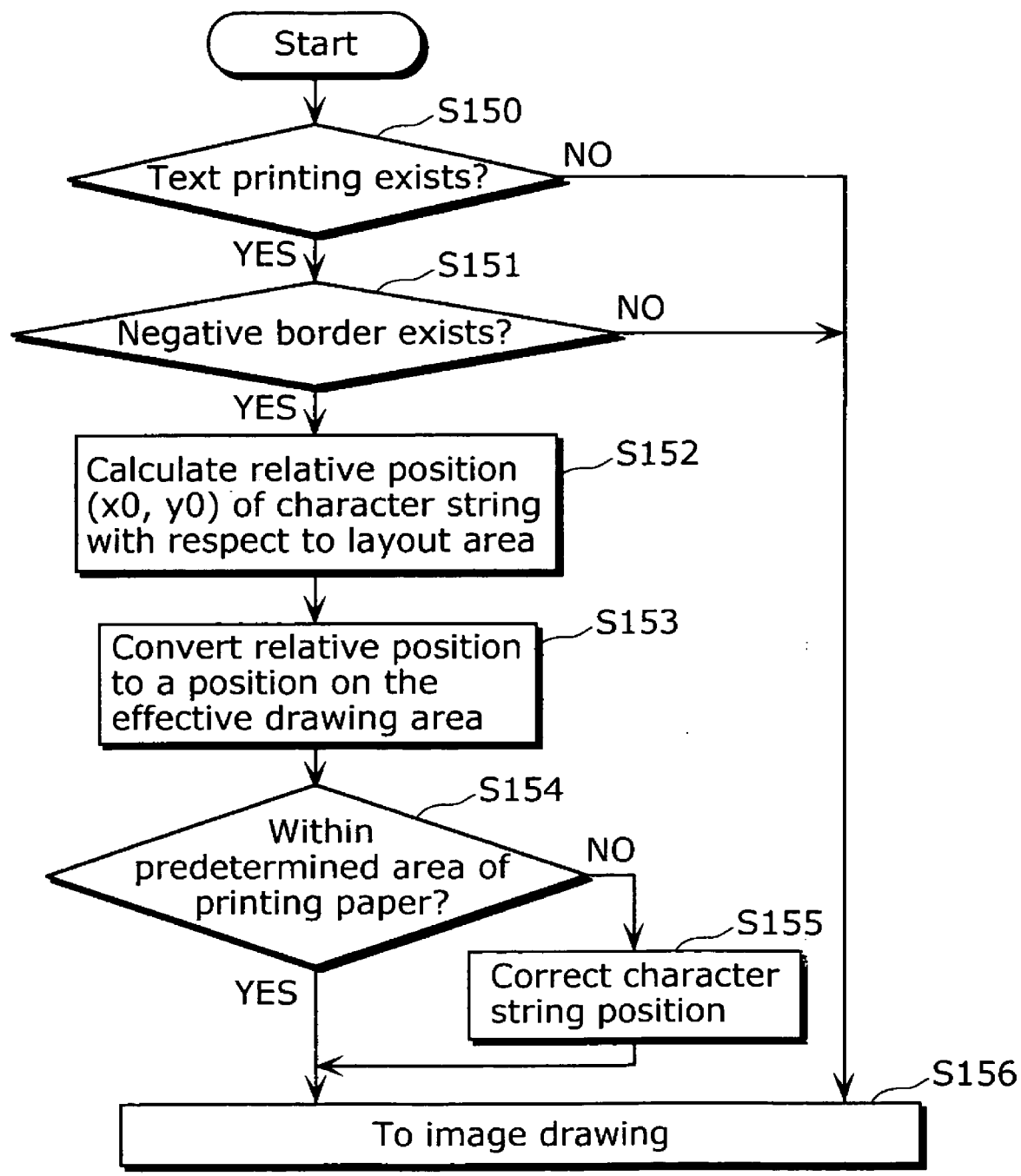
FIG. 27 is a flowchart showing the printing operation in the third embodiment of the present invention.

FIG. 27 is a flowchart showing the flow of an operation in the present embodiment.

First, the position obtainment unit 2101 analyzes printing information and judges whether or not text printing is required (Step S150). As a result, in the case where text printing is required (Yes in Step S150), the position obtainment unit 2101 determines whether or not a negative border is set for such character string (Step S151). As a result, when a negative border is set (Yes in Step S151), the character string position determining unit 2201 calculates a relative position for the character string, on the layout area 11 (Step S152). Subsequently, such relative position is converted to a position on the effective drawing area so as to obtain an on-paper position when projecting onto printing paper (Step S153). Next, the text data to be drawn is actually laid out, and judged as to whether or not it is within a predetermined area on the printing paper, in other words, whether or not it extends beyond the printing paper (Step S154). As a result, in the case where it extends beyond the printing paper (No in Step S154), the character string correction unit 2202 corrects the position at which the character string is to be laid out, and establishes the position at which the character string is to be laid out (Step S155). Subsequently, the bitmap data for the object image and the character string which are laid out on the effective drawing area is generated and printed (Step S156).

Figure 28:
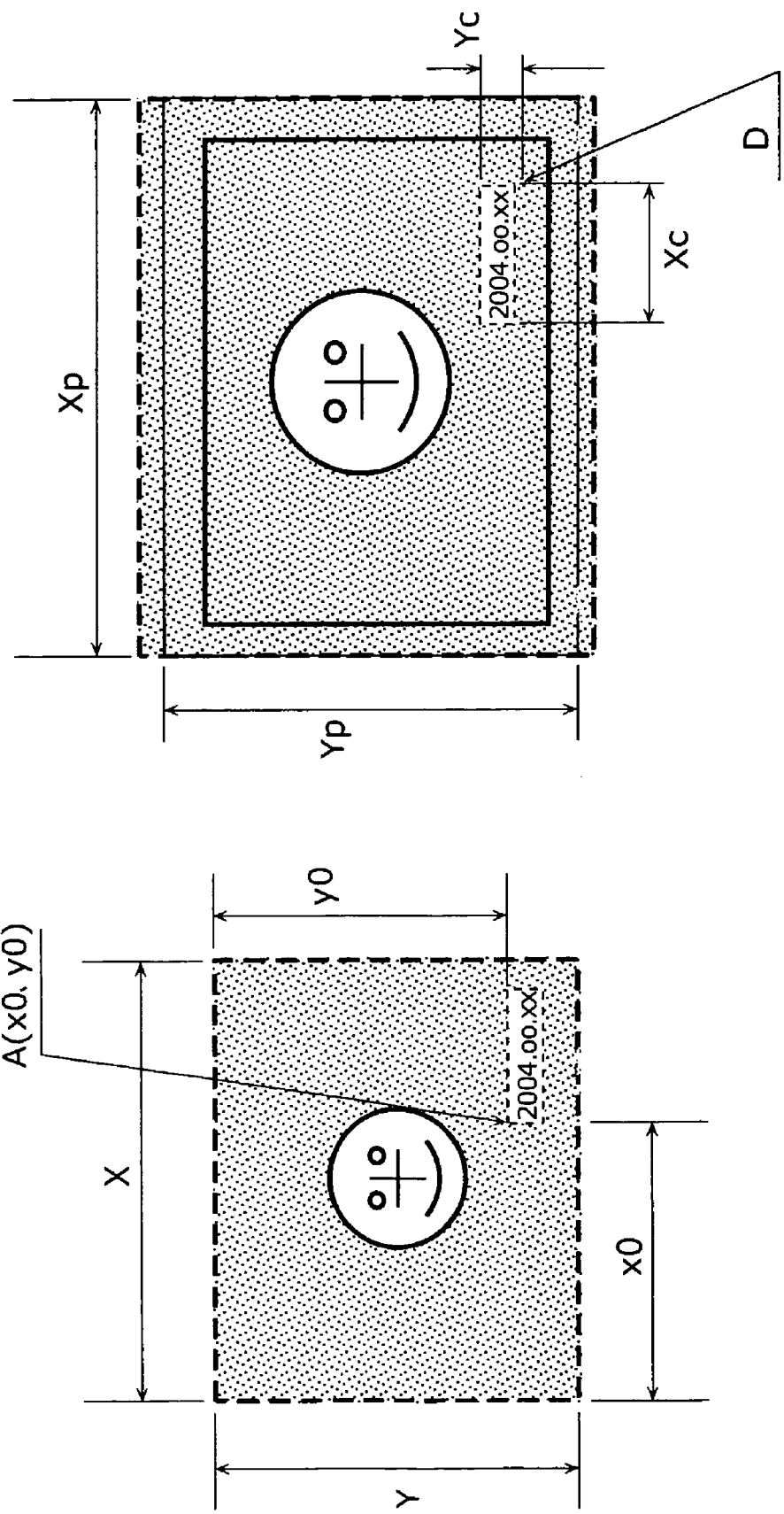
FIG. 28 is an explanatory diagram for the date printing correction calculation in the third embodiment of the present invention.

For example, as shown in FIG. 28($a$), when the upper left of the layout area is the starting point, the position of the character string is assumed to be $A(x0, y0)$ and the size of the layout area 11 is $(X,Y)$. A relative position B with respect to the layout area 11 becomes $B(x0/X, y0/Y)$. When converting, in this proportion, to a position on the effective drawing area of a size $(Xp, Yp)$, such position becomes $C(x0*Xp/X, y0*Yp/Y)$. When the size of the character string is $(Xc, Yc)$, it is verified that a point $D(x0*Xp/X+Xc, y0*Yp/Y+Yc)$ in the layout area 11 is located in an area which is a predetermined amount, or more, inside the printing paper or from an edge of the printing paper. Assuming that the character string extends beyond that, a correction is carried out.

In this manner, text data can be laid out on a predetermined position on the print image.

Fourth Embodiment

In the aforementioned third embodiment, the position of a character string is established through an exact but complicated process. However, when considering only content such as a picture, there is a method which simplifies and limits the superimposing of such character strings to the printing of a date, a serial number, or a filename and the like. In general, these items of information are often laid out on the four corners of a picture image. Therefore, it can be considered that as long as they are generally located in the four corners, a detailed and exact determination of the position need not be carried out.

For example, in the case where there is an identifier indicating that the details of the print data show picture printing, for example, as shown in FIG. 29(a), it is determined on which area, resulting from the quartering of the effective drawing area, the character string should be laid out. The positions, within the printing paper, on which to lay out is fixed beforehand in the form of a table, and the layout position of the character string is established according to this table, as shown in FIG. 29(b). In so doing, the character string can be laid out without it extending beyond the paper.

It should be noted that although the lower right position for the character string is established here, this is because the layout location is in the lower right area of the 4 quarters, and in order to consider the size and height of the character string so that it does not extend beyond the printing paper, it is necessary to confirm the lower right area for the character string. Therefore, the position which is to be the position for laying out the character string changes depending on which among the partitioned areas the character string is in.

Furthermore, although in the present embodiment, the areas are established as quarters, it goes without saying that the same effect is attained regardless of the number of partitions.

Fifth Embodiment

In the third and fourth embodiments, explanation is made regarding the position of the character sting. In the present embodiment, explanation shall be made regarding the size of the character string.

Figure 30:
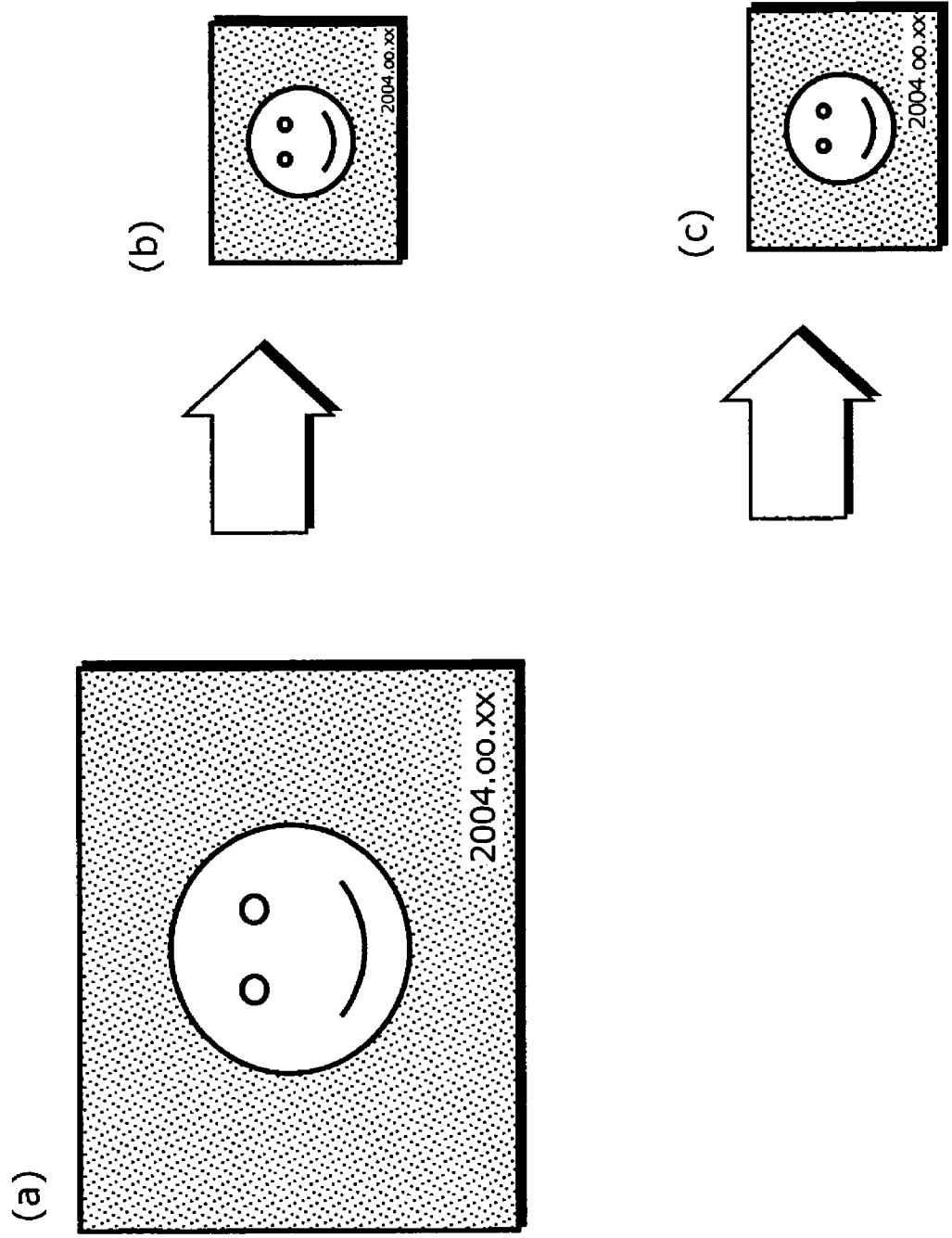
FIG. 30 is a diagram showing the outline diagram depicting the superimposition of the date, in the fifth embodiment of the present invention.

In the case where the print data is a description as shown in FIG. 23, it is conceivable that the provider has created the print data with the idea of having it printed in the A4 size. However, the size of the paper available for printing, or the size of printing paper in a received print instruction is not necessarily the A4 size. In this case, printing is carried out with reduction being performed to conform to the specified printing paper size. Here, the case where the printing paper is an L-format paper shall be considered. In the case where a date is provided, the date also has to be reduced, or else, only the date is big and stands out. However, when the same ratio as the object image is used in the reduction, the date instead becomes too small and unsightly, as shown in FIG. 30(b). In view of this, the size of the character string to be superimposed is established using the subsequent procedure.

Figure 31:
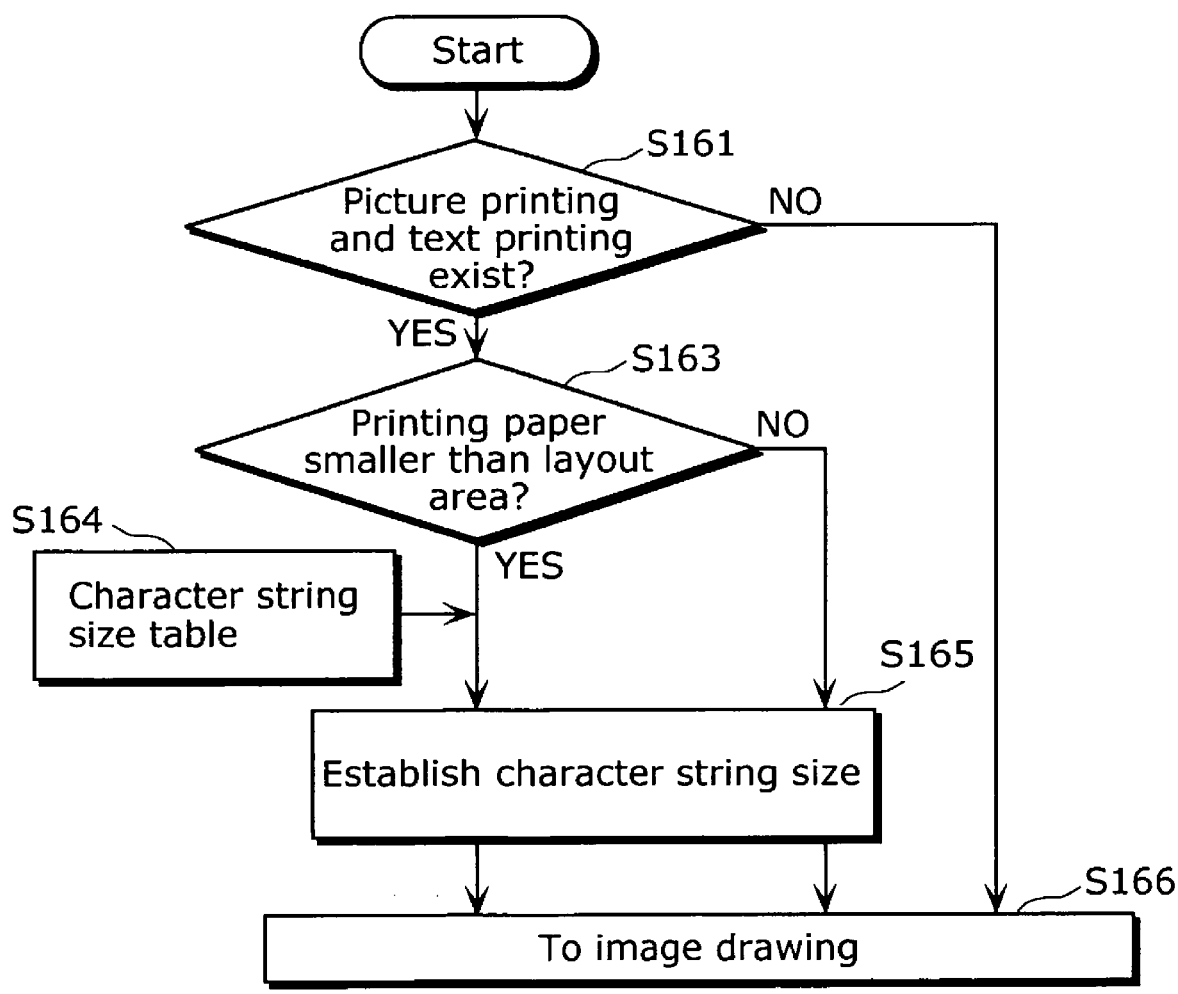
FIG. 31 is a flowchart showing the printing operation in the fifth embodiment of the present invention.

Here, explanation is carried out regarding the operation in the case where the print data in FIG. 23 is received and printed in the L-format. FIG. 31 is a flowchart showing the flow of operation in the present embodiment.

First, it is judged whether the print data indicates picture printing, and whether there are text characters to be superimposed (Step S161). In the judgment for picture printing, a tag may be described inside the print data, which distinguishes that it is for picture printing, or judgment may be made when there is only one image data for one page. Here, the method of judgment is not particularly defined. Next, it is judged whether or not the layout area is smaller than the printing paper (Step S163). In this example, it is presumed that in the print data, a size of 297 mm×210 mm is assumed, whereas the actual paper to be printed on is 127 mm×89 mm. In this case, when the character string is reduced using the current ratio as is, 16 pt text characters become 6.7 pt. Incidentally, pt (point) is a unit often used in indicating the size of text characters, and 1 pt=1/72 inches. Therefore, text characters of about 5.6 mm become about 2.4 mm. This makes it too small and, assuming that the size of text characters in the L-format is 10 pt, when the size of text characters in the A4 format is assumed as 1, the size of text characters in the L-format becomes 0.625. In the same manner, the size of text characters for other paper sizes is also held in advance as relative values in a text character size table in the layout unit 204 (Step S164). Subsequently, in the case where the layout area is smaller than the printing paper (Yes in Step S163), the text character size that should be outputted is established from the text character size specified in the print data and the text character size table (Step S165). More specifically, when the print data specifies 18 pt for A4, the size is 11.2 pt in the L-format, and when 12 pt for A4 is specified, the size becomes 7.5 in the L-format. As a result, the size of the text characters to be superimposed does not become too small, and a balanced output result can be attained as shown in FIG. 30(c).

Note that although the case of the reduction of a character string is explained in the present embodiment, the same effect can be attained when the percentages for magnification, the smaller being taken as the basis, are made into a table.

Sixth Embodiment

The previous embodiment shows a method in which correction is performed in accordance with the position of text characters, in the case where the text characters are to be written over and superimposed on image information. In the present embodiment, a method is explained in which image information and text information are separated and processing carried out.

Figure 33:
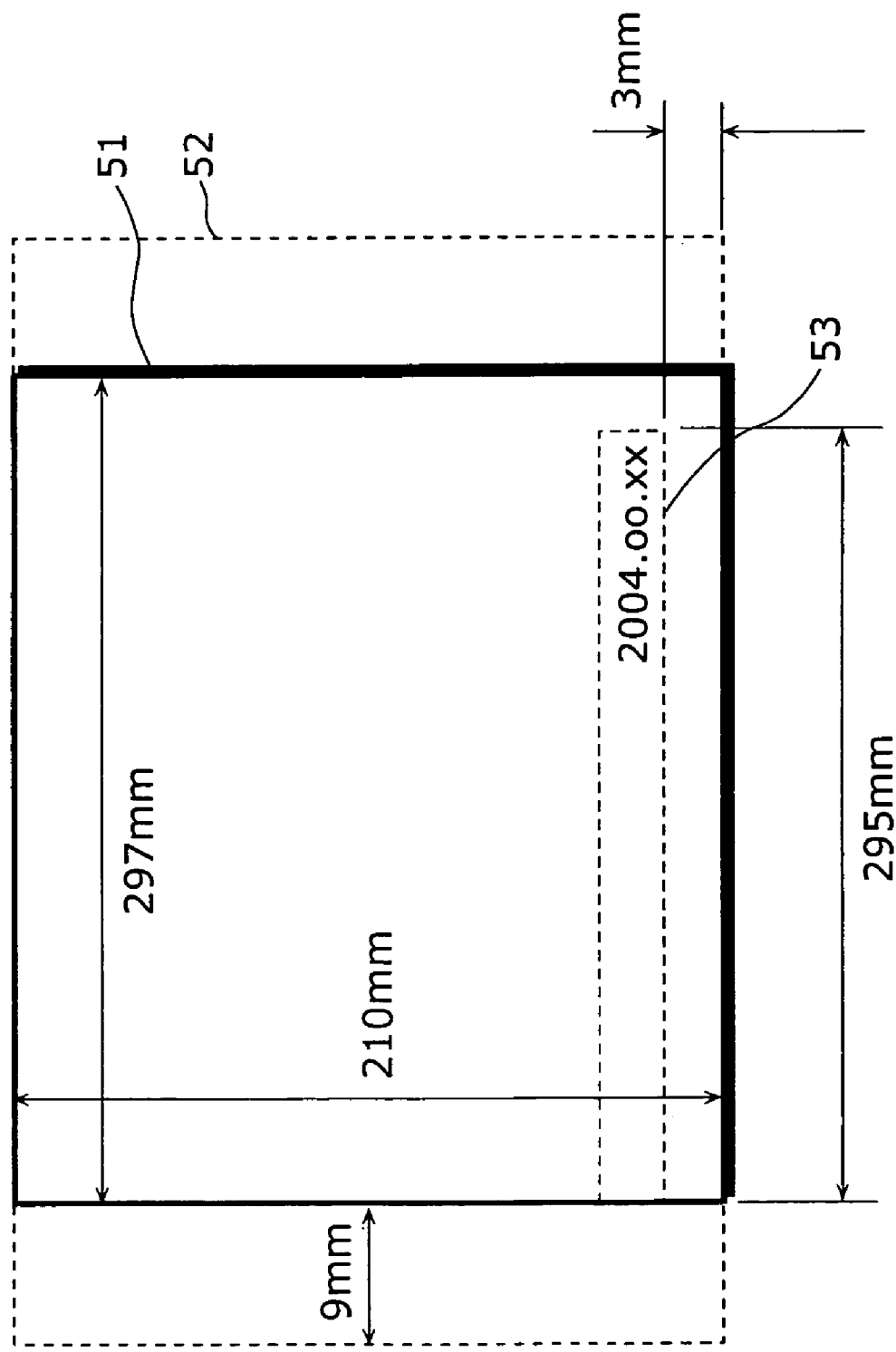
FIG. 33 is a diagram showing the printing result for the print data in FIG. 32.

The present embodiment assumes print data as shown in FIG. 32. The printing result required is as that shown in FIG. 33. Specifically, the print data in FIG. 32 assumes an A4 size (297 mm×210 mm) layout area 51 and, as in the second embodiment, "borderless" printing is instructed (description 33). Furthermore, the placement of a 210 mm×315 mm box 52 having a −9 mm offset to the left with respect to the layout area 51 is also instructed (description 34). In addition, it is instructed (description 35) that a character string 311 should be right-aligned such that the bottom edge of the character string 53 is in a position 3 mm above the bottom edge of the layout area 51, and its right edge is laid out to come 292 mm from the left edge of the layout area 51. Furthermore, it is instructed (description 36 to 38) that "yoko.jpg" should be drawn for the box 52, and subsequently, a date "2004.oo.xx" should be drawn for the character string 53. Here, the image data serving as "yoko.jpg" used in the explanation is assumed to have a 2:3 (vertical×horizontal) aspect ratio.

Figure 34:
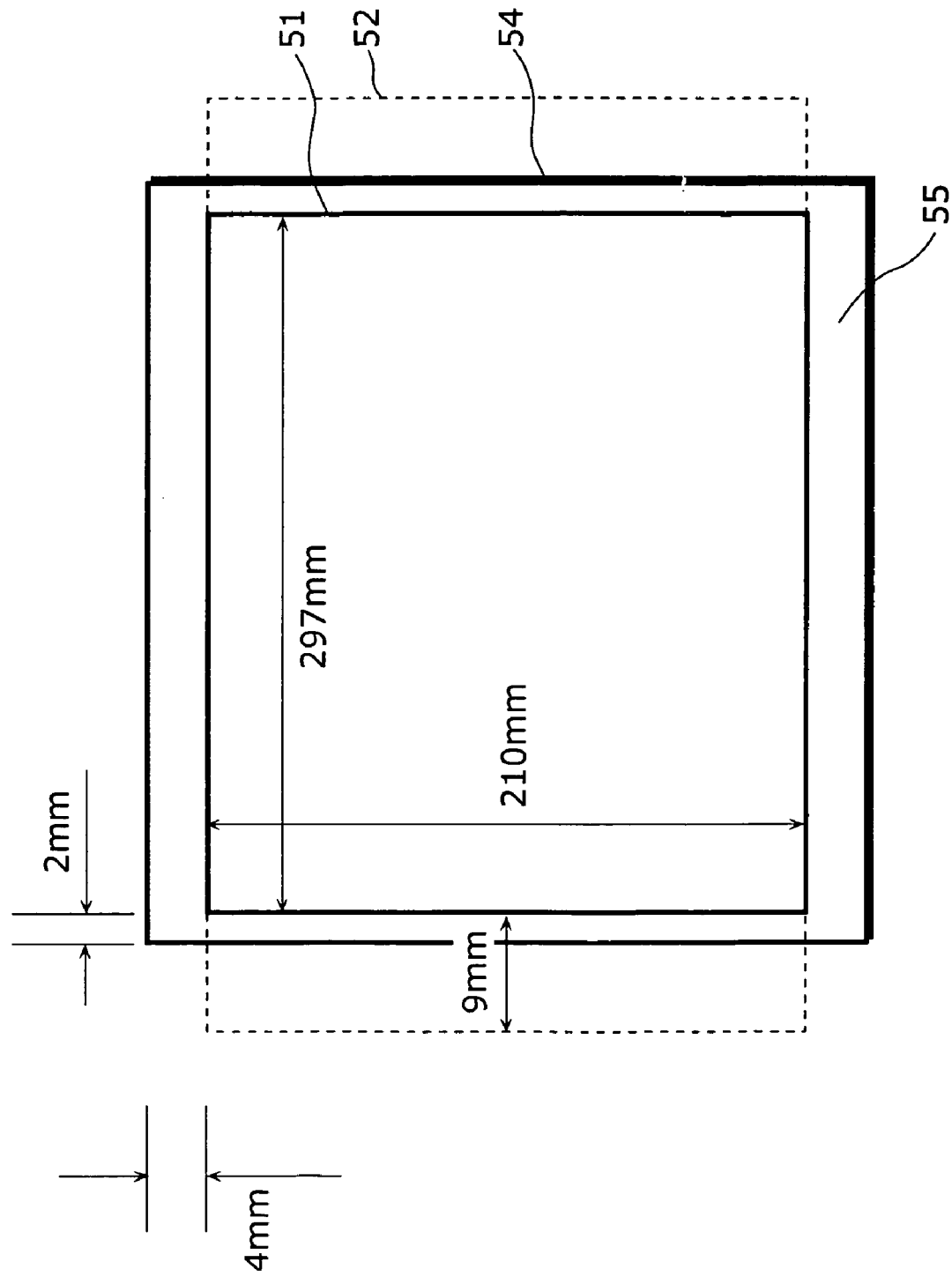
FIG. 34 is a diagram an example of correction in borderless printing.

Here, as shown in FIG. 34, it is common that, in order to compensate for mechanical displacement and the like in printers which handle "borderless" printing, the effective drawing area 54 needs to be made larger than the printing paper. In the present embodiment, the same size is shown for the printing paper and the layout area 51. The size of the effective drawing area 54 is printer-specific, and is difficult to reflect, in advance, in print data. According to the present embodiment, with the details described in print data, "centered "borderless" printing of "yoko.jpg" on A4 paper (210 mm×297 mm)" is expected. However, there is no description in the print data on how the data in the layout area 51 is to be transferred to the effective drawing area 54. In other words, the details become printer dependent.

Figure 35:
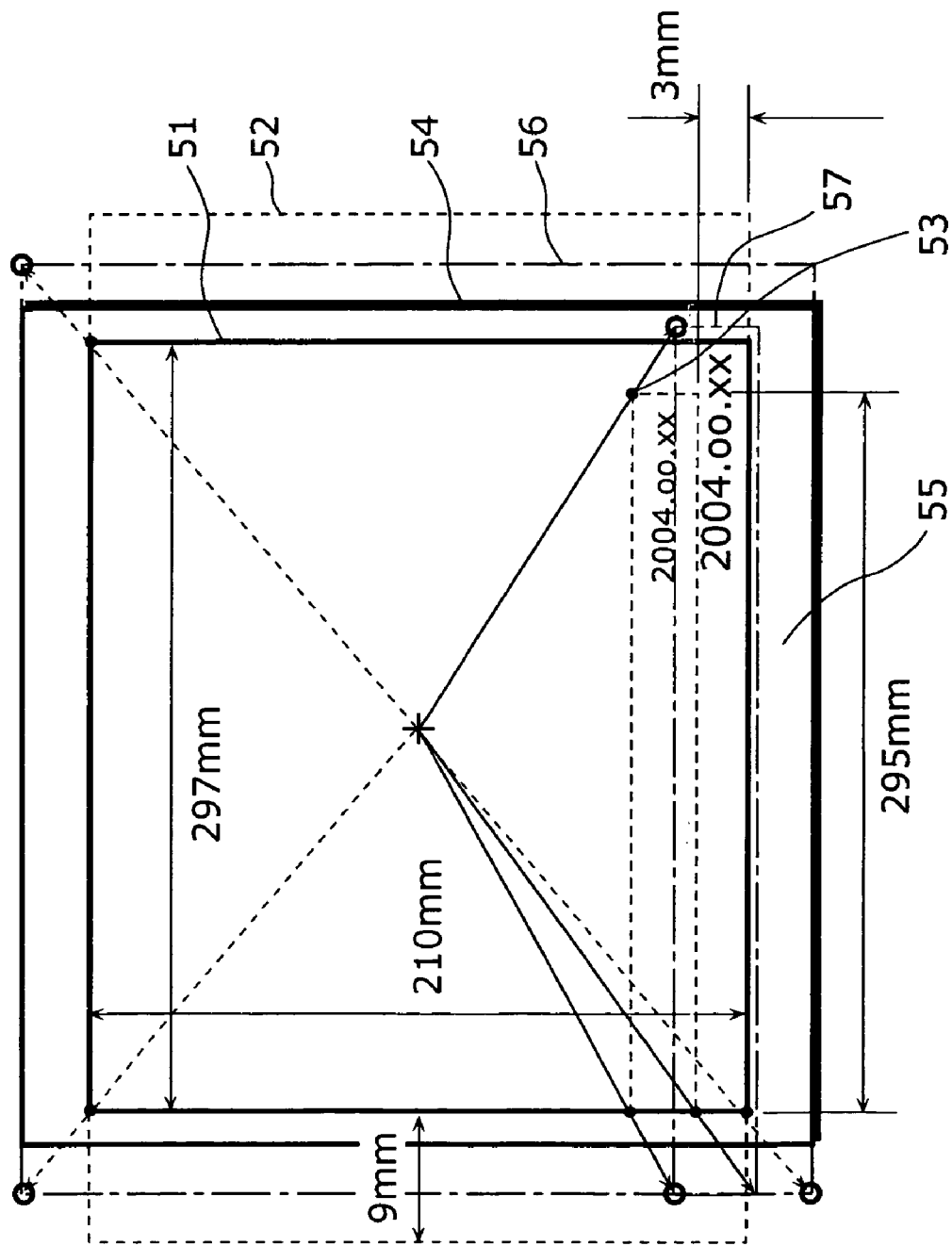
FIG. 35 is a diagram showing the case where image data including text information is magnified/reduced.

On the other hand, when the details spread on the layout area 51 are merely transferred, as is, to the effective drawing area 54, an area 55 with no drawing data may be left over, and there is a possibility that such area 55 may become a border at the time of printing. In order to avoid this, it is necessary to magnify the details in the layout area 51. As the aspect ratio for image data of DSC and the like is not necessarily the same as the printing paper (here, the same as the layout area 51), the layout area 51 is magnified according to a magnifying rate at which it is at its smallest while being larger than the effective drawing area 54, as shown in FIG. 35. This shall be referred to as an area 56.

Here, when magnification is carried out after image data and a character string are spread on the layout area 51, the position of the character string with respect to the printing paper is also changed, as shown in FIG. 35. In the case of magnification using the center of the layout area 51 as a base, when the position and size of the character string is magnified with this magnification rate, there are instances where, depending on the case, the position of the character string extends beyond the effective drawing area. Furthermore, from a viewer's point of view, it is more desirable that when the printing paper is the same, the date and the like of a picture are printed at the same location.

Figure 36:
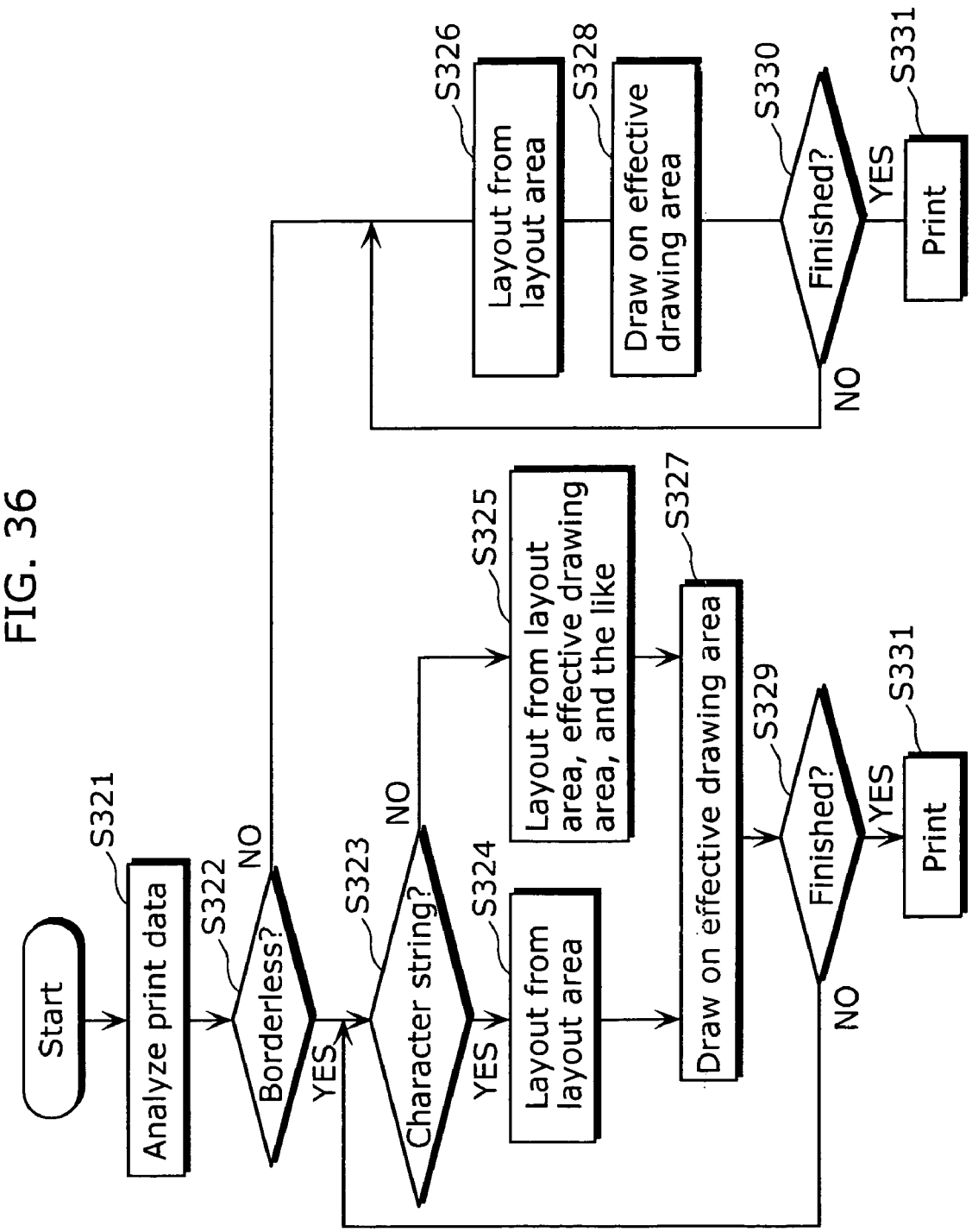
FIG. 36 is a flowchart showing the processing order in the sixth embodiment of the present invention.
Figure 37:
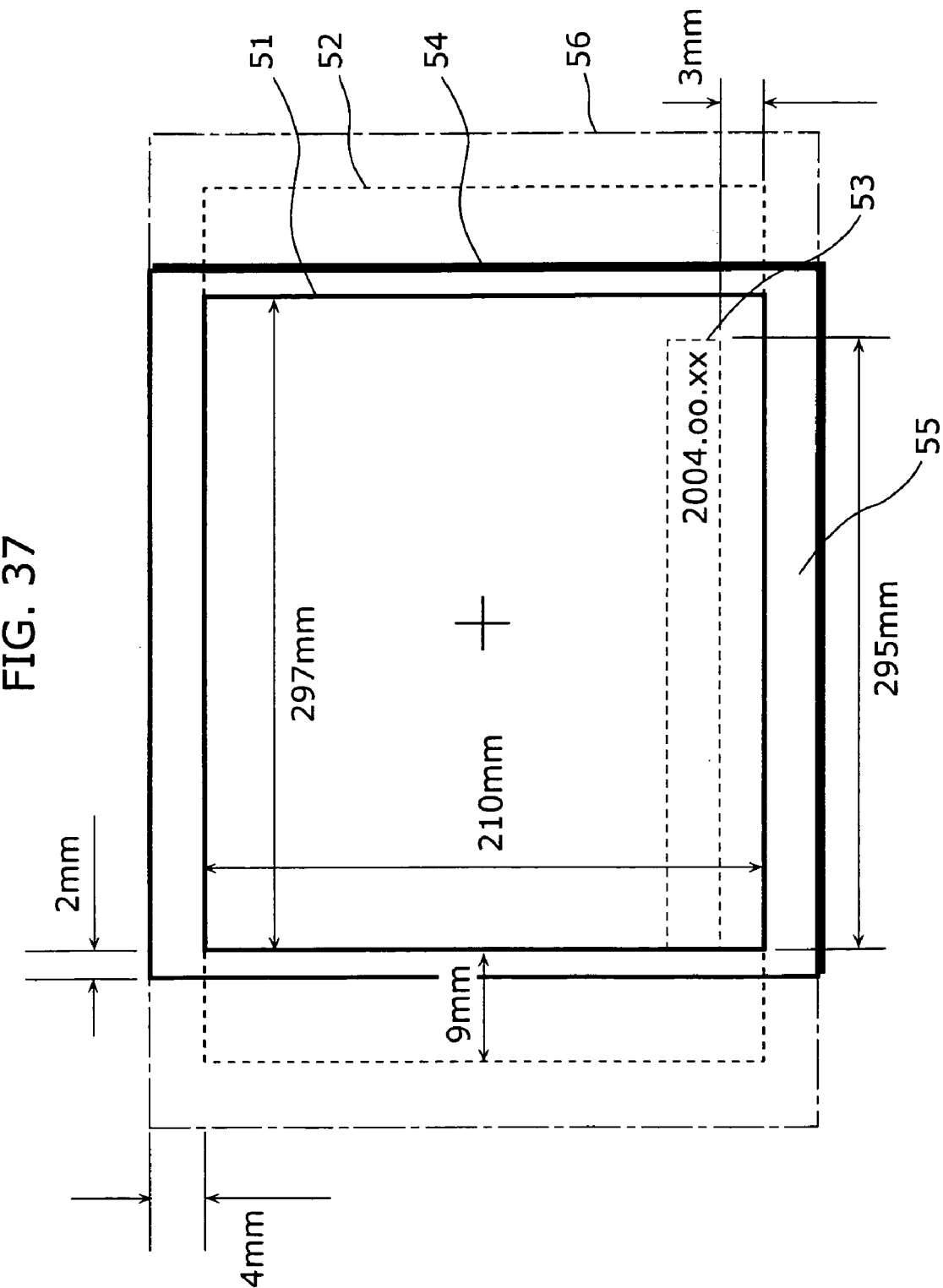
FIG. 37 is a diagram showing the layout result for text information in the sixth embodiment of the present invention.

As such, in order to realize "borderless" printing without moving the position of the date and without changing the size of the text characters, there is a need to separate the processing for the image from the processing for the text characters. FIG. 36 is a flowchart showing the process for this case, and FIG. 37 is a diagram showing the layout result.

First, upon receiving print data, the print data is analyzed (Step S321), and the process is branched off for the case where "borderless" printing is required and for the case where it is not (Step S322). In the case of "borderless" printing (Yes in Step S322), it is judged that the printing of a picture is to be attempted, and the image processing and the text character processing are separated (Step S323). In the case of image data (No in Step S323), magnification is carried out, based on the relation of the layout area 51 and the effective drawing area 54, and with the aspect ratio of the print data being maintained as is, so that the layout area 51 becomes larger than the effective drawing area 54 (area 56), and then the layout is carried out. This layout is carried out so that the relation of the position 52 of the image with respect to the layout area 51 and the relation of layout data with respect to the effective drawing area 54 are relatively the same (Step S325). In the case of text data (Yes in Step S323), the layout is carried out with respect to the layout area 51 (Step S324). Subsequently, data for the effective drawing area is generated for each of the cases (Step S329), and when processing for all elements is completed (Step S329), printing is carried out (Step S331).

Furthermore, in the case where "borderless" printing is not required (No in Step 322), following the instruction in the print data, the layout is carried out on the drawing area (Step S326), drawing is carried out directly onto the effective drawing area (Step S328), and when all processes are completed (Step S330), printing is carried out (Step S331).

Note that although in FIG. 36, a procedure is explained in which drawing is carried out on the effective drawing area after the layout is performed, it is also possible to layout all the elements and carry out drawing and printing with the same timing.

Furthermore, although the description "frame:non" is interpreted as "borderless" printing in the present embodiment, the present invention is not bound to such description. In addition, a method in which the "borderless" instruction is sent using a print command, instead of being described in print data, is also possible.

Furthermore, as the effective drawing area and the layout area are conceptual areas and not real spaces, the same effect is also obtained when image superimposition is carried out by superimposing on the effective drawing area.

INDUSTRIAL APPLICABILITY

The printing apparatus in the present invention possesses a function for analyzing XML-related data such as XHTML-Print, and printing a picture content with optimal layout even without the user being concerned, and is useful in a printer and the like which executes printing by having print data or a print command sent from a host device other than a PC.

The invention claimed is:

1. A printing apparatus which analyzes print data written in a markup language, and prints, onto a print medium, object data which is an object to be printed, said printing apparatus comprising:

a layout area information obtainment unit for obtaining layout area information specified by the print data, indicating a layout area on which the object data is to be laid out;

an effective drawing area information obtainment unit for obtaining effective drawing area information indicating a printing area which is dependent on said printing apparatus;

a layout unit for laying out the object data onto the layout area based on respective sizes of the object data and the layout area, and to lay out the layout area onto the effective drawing area based on respective sizes of the layout area and the effective drawing area; and a printing unit for printing the object data laid out on the effective drawing area by said layout unit, wherein said layout unit includes:

a first magnification/reduction rate calculation unit for calculating a magnification rate or a reduction rate for the object data so that one of a height and a width of the object data is the same as with the layout area, and the other is the same or larger than with the layout area;

a first layout unit for enlarging/reducing the object data using the magnification rate or the reduction rate calculated by said first magnification/reduction rate calculation unit and laying out the enlarged/reduced object data onto the layout area;

a second magnification/reduction rate calculation unit for calculating a magnification rate or a reduction rate for the layout area having the enlarged/reduced area laid out so that one of a height and a width of the layout area is the same as with the effective drawing area, and the other is the same or larger than with the effective drawing area; and a second layout unit for enlarging/reducing the layout area onto the effective drawing area using the magnification rate or the reduction rate calculated by said second magnification/reduction rate calculation unit and laying out the enlarged/reduced layout area onto the effective drawing area, wherein the printing unit prints the enlarged/reduced object data laid out on the effective drawing area.

2. The printing apparatus according to claim 1, further comprising a borderless print instruction detection unit for detecting an instruction for borderless printing, wherein, when the borderless print instruction is detected, said effective drawing area information obtainment unit obtains a data area required in borderless printing, as the effective drawing area.

3. The printing apparatus according to claim 1, further comprising a bordered print instruction detection unit for detecting an instruction for bordered printing, wherein, when the bordered print instruction is detected, said effective drawing area information obtainment unit obtains a data-printable area as the effective drawing area.

4. The printing apparatus according to claim 1, wherein, when laying out the layout area onto the effective drawing area using the magnification rate or the reduction rate calculated by said second magnification/reduction rate calculation unit, said second layout unit lays out the layout area so that a top and a bottom or a left-side and a right-side of the layout area which extend beyond the effective drawing area are approximately even.

5. The printing apparatus according to claim 1, wherein said second magnification/reduction rate calculation unit is capable of calculating, as the magnification rate or the reduction rate for the layout area, a reduction rate with a largest numerical value or a magnification rate with a lowest numerical value at which the effective drawing area is included within the layout area as a result of aligning a center of the layout area with a center of the effective drawing area, and magnifying or reducing the height and the width of the layout area at an equal rate.

6. The printing apparatus according to claim 1, wherein said second layout unit is capable of correcting the effective drawing area information so as to be smaller than the effective drawing area and of similar shape to printing paper, based on a similitude relation between the print medium and the effective drawing area, and said second magnification/reduction rate calculation unit is capable of calculating the magnification rate or the reduction rate for the layout area so that the layout area has a smallest size in which the effective drawing area corrected by said second layout unit is included.

7. The printing apparatus according to claim 1, further comprising
a position obtainment unit operable to obtain position information specified by the print data, indicating a position at which a character string is to be superimposed on the object data,
wherein said layout unit further includes:
a character string superimposing position determining unit for determining a position at which the character string is to be superimposed, based on the position information obtained by said position obtainment unit, the magnification rate or the reduction rate calculated by said first magnification/reduction rate calculation unit, and the magnification rate or the reduction rate calculated by said second magnification/reduction rate calculation unit;
a character string correction unit for correcting the position at which the character string is to be superimposed so that the character string is printed within a predetermined area of the print medium, in the case where the position at which the character string is to be superimposed extends beyond the print medium or comes close to a predetermined area away from an edge of the print medium, the position being determined by said position obtainment unit; and
a character string layout unit for laying out the character string by superimposing the character string at the position at which the character string is to be superimposed on the object data, the position being corrected by said character string correction unit.

8. The printing apparatus according to claim 1, wherein said layout unit further includes
a character string layout unit for magnifying/reducing a character string to be superimposed on the object data, using a magnification rate or a reduction rate which is different from the magnification rate or the reduction rate calculated by said first magnification/reduction rate calculation unit and the magnification rate or the reduction rate calculated by said second magnification/reduction rate calculation unit, and laying out the magnified or reduced character string by superimposing the character string on the object data.

9. The printing apparatus according to claim 8, further comprising:
a specified size obtainment unit for obtaining a size of the print medium, specified by the print data or a print execution instruction; and
a medium size obtainment unit for obtaining a size of the print medium, used by said printing apparatus,
wherein, in the case where the size of the print medium, specified by the print data or the print execution instruction, and the size of the print medium used by said printing apparatus are different, said character string layout unit calculates the magnification rate or the reduction rate for the character string based on the respective sizes of the print medium, and to lay out the character string by superimposing the character string on the object data.

10. The printing apparatus according to claim 1, wherein the print data further includes text information, said printing apparatus further comprises:
a character string layout unit for laying out the text information onto the layout area; and
a character string layout correction unit for storing a size and a position laid out by said character string layout unit, and changing the size and the position into coordinates on the effective drawing area, and
said printing unit being capable of superimposing the text information changed into coordinates by said character string layout correction unit, on the object data laid out on the effective drawing area by said layout unit, and to print the superimposed text information and the object data.

11. The printing apparatus according to claim 1, wherein the markup language is an XML language.

12. A printing method for analyzing print data written in a markup language, and printing, onto a print medium, object data which is an object to be printed, said method comprising:
a layout area information obtainment step of obtaining layout area information specified by the print data, indicating a layout area on which the object data is to be laid out;
an effective drawing area information obtainment step of obtaining effective drawing area information indicating a printing area which is dependent on the printing apparatus;
a layout step of laying out the object data onto the layout area based on respective sizes of the object data and the layout area, and laying out the layout area onto the effective drawing area based on respective sizes of the layout area and the effective drawing area; and
a printing step of printing the object data laid out on the effective drawing area in said layout step,
wherein said layout step is performed by a layout unit including:
a first magnification/reduction rate calculation unit for calculating a magnification rate or a reduction rate for the object data so that one of a height and a width of the object data is the same as with the layout area, and the other is the same or larger than with the layout area;

a first layout unit for enlarging/reducing the object data using the magnification rate or the reduction rate calculated by said first magnification/reduction rate calculation unit and laying out the enlarged/reduced object data onto the layout area;

a second magnification/reduction rate calculation unit for calculating a magnification rate or a reduction rate for the layout area having the enlarged/reduced area laid out so that one of a height and a width of the layout area is the same as with the effective drawing area, and the other is the same or larger than with the effective drawing area; and a second layout unit for enlarging/reducing the layout area onto the effective drawing area using the magnification rate or the reduction rate calculated by said second magnification/reduction rate calculation unit and laying out the enlarged/reduced layout area onto the effective drawing area wherein a printing unit prints the enlarged/reduced object data laid out on the effective drawing area.

13. A program embodied on a non-transitory computer-readable medium for analyzing print data written in a markup language, and printing, onto a print medium, object data which is an object to be printed, said program causing a computer to execute:

a layout area information obtainment step of obtaining layout area information specified by the print data, indicating a layout area on which the object data is to be laid out;

an effective drawing area information obtainment step of obtaining effective drawing area information indicating a printing area which is dependent on the printing apparatus;

a layout step of laying out the object data onto the layout area based on respective sizes of the object data and the layout area, and to lay out the layout area onto the effective drawing area based on respective sizes of the layout area and the effective drawing area; and a printing step of printing the object data laid out on the effective drawing area in said layout step, wherein said layout step is performed by a layout unit including:

a first magnification/reduction rate calculation unit for calculating a magnification rate or a reduction rate for the object data so that one of a height and a width of the object data is the same as with the layout area, and the other is the same or larger than with the layout area;

a first layout unit for enlarging/reducing the object data using the magnification rate or the reduction rate calculated by said first magnification/reduction rate calculation unit and laying out the enlarged/reduced object data onto the layout area;

a second magnification/reduction rate calculation unit for calculating a magnification rate or a reduction rate for the layout area having the enlarged/reduced area laid out so that one of a height and a width of the layout area is the same as with the effective drawing area, and the other is the same or larger than with the effective drawing area; and a second layout unit for enlarging/reducing the layout area onto the effective drawing area using the magnification rate or the reduction rate calculated by said second magnification/reduction rate calculation unit and laying out the enlarged/reduced layout area onto the effective drawing area wherein a printing unit prints the enlarged/reduced object data laid out on the effective drawing area.

\* \* \* \* \*